(12) United States Patent
Hemstock

(10) Patent No.: US 10,967,305 B2
(45) Date of Patent: Apr. 6, 2021

(54) BOUNDARY LAYER MODIFICATION IN CLOSELY-SPACED PASSAGES

(71) Applicant: SPECIALIZED DESANDERS INC., Calgary (CA)

(72) Inventor: Christopher A. Hemstock, Calgary (CA)

(73) Assignee: SPECIALIZED DESANDERS INC., Calgary (CA)

( * ) Notice: Subject to any disclaimer, the term of this patent is extended or adjusted under 35 U.S.C. 154(b) by 393 days.

(21) Appl. No.: 16/027,847

(22) Filed: Jul. 5, 2018

(65) Prior Publication Data

US 2018/0345180 A1    Dec. 6, 2018

Related U.S. Application Data

(63) Continuation-in-part of application No. 15/991,771, filed on May 29, 2018.

(60) Provisional application No. 62/512,600, filed on May 30, 2017, provisional application No. 62/529,309, filed on Jul. 6, 2017.

(51) Int. Cl.
*B01D 29/46* (2006.01)
*B01D 46/40* (2006.01)

(52) U.S. Cl.
CPC ........... *B01D 29/46* (2013.01); *B01D 46/406* (2013.01)

(58) Field of Classification Search
CPC ............... B01D 17/02; B01D 17/0211; B01D 21/0045; B01D 2221/04; E21B 43/34; F15D 1/14
See application file for complete search history.

(56) References Cited

U.S. PATENT DOCUMENTS

| | | |
|---|---|---|
| 1,512,358 A | 10/1924 | Neill |
| 2,227,344 A | 12/1940 | Hartmann |
| 3,473,668 A | 10/1969 | Bunyard et al. |
| 3,645,298 A | 2/1972 | Roberts et al. |
| 4,517,089 A | 5/1985 | Arnaud |
| 4,686,041 A | 8/1987 | Van den Berg et al. |
| 4,721,567 A | 1/1988 | Uram |

(Continued)

FOREIGN PATENT DOCUMENTS

| | | |
|---|---|---|
| CA | 2433741 | 10/2003 |
| CA | 2407554 | 4/2004 |

(Continued)

OTHER PUBLICATIONS

Machine translation of WO-2017084657-A1 (Year: 2020).*

(Continued)

*Primary Examiner* — Cabrena Holecek
(74) *Attorney, Agent, or Firm* — Parlee Mclaws LLP; Patrick Laycock

(57) ABSTRACT

Described is a stacked-plate apparatus having a plurality of plates stacked along an axis and having gaps between adjacent plates, each of which act as flow passageways for flow of fluid from a fluid inlet to a fluid outlet. Pairs of adjacent plates comprise one and optionally two lips, which extend axially into the flow passageway at the fluid inlet, thereby narrowing an inlet gap between the plates at the fluid inlet. The lips enhance the flow of fluid towards the fluid outlet of the flow passageway, for at least a working distance downstream thereof, as compared to a pair of adjacent plates that does not have the lips.

18 Claims, 21 Drawing Sheets

(56) References Cited

U.S. PATENT DOCUMENTS

| | | | |
|---|---|---|---|
| 4,726,900 | A | 2/1988 | Keskinen et al. |
| 4,744,901 | A | 5/1988 | Drori |
| 4,753,731 | A | 6/1988 | Drori |
| 4,882,050 | A | 12/1989 | Kopf |
| 4,966,702 | A | 10/1990 | Drori |
| 5,173,195 | A | 12/1992 | Wright et al. |
| 5,292,479 | A | 3/1994 | Haraga et al. |
| 5,341,848 | A | 8/1994 | Laws |
| 5,553,669 | A | 9/1996 | Trainer |
| 5,935,424 | A | 8/1999 | Dyer et al. |
| 6,601,460 | B1 | 8/2003 | Materna |
| 6,793,177 | B2 | 9/2004 | Bonutti |
| 6,983,852 | B2 | 1/2006 | Hemstock et al. |
| 7,210,585 | B2 | 5/2007 | Hajek |
| 8,794,574 | B2 | 8/2014 | Lang |
| 8,881,994 | B2 | 11/2014 | Wetzel et al. |
| 9,308,987 | B1 | 4/2016 | Riggins |
| 9,861,921 | B2 | 1/2018 | Hemstock et al. |
| 9,895,634 | B2 | 2/2018 | Selwyn |
| 2011/0139893 | A1 | 6/2011 | Wetzel et al. |
| 2015/0021257 | A1 | 1/2015 | Selwyn |
| 2015/0144546 | A1 | 5/2015 | Iwasaki |
| 2015/0165358 | A1 | 6/2015 | Hemstock et al. |
| 2015/0273374 | A1 | 10/2015 | Leiss |
| 2018/0161705 | A1 | 6/2018 | Hemstock |

FOREIGN PATENT DOCUMENTS

| | | |
|---|---|---|
| CA | 2799278 | 8/2013 |
| CA | 2873355 | 6/2015 |
| CN | 203598568 | 5/2014 |
| FR | 372264 | 6/1942 |
| GB | 1022293 | 4/1912 |
| GB | 336122 | 10/1930 |
| GB | 1022293 A * | 3/1966 ............ B01D 29/46 |
| WO | 2013128171 | 9/2013 |
| WO | 2017084657 | 5/2017 |
| WO | WO-2017084657 A1 * | 5/2017 ............ B01D 29/46 |

OTHER PUBLICATIONS

International Search Report received in corresponding PCT Application No. PCT/CA2018/050824 dated Sep. 14, 2018, 3 pages.
Written Opinion received in corresponding PCT Application No. PCT/CA2018/050824 dated Sep. 14, 2018, 5 pages.
International Preliminary Report on Patentability received in corresponding PCT Application No. PCT/CA2017/051484 dated Apr. 4, 2019, 26 pages.
International Search Report received in corresponding PCT Application No. PCT/CA2017/051484 dated Feb. 27, 2018, 3 pages.
Written Opinion of the International Searching Authority received in corresponding PCT Application No. PCT/CA/2017/051484 dated Feb. 27, 2018, 5 pages.
International Preliminary Report on Patentability received in corresponding PCT Application No. PCT/CA2018/050626 dated Dec. 3, 2019, 6 pages.
Written Opinion of the International Searching Authority received in corresponding PCT Application No. PCT/CA2018/050626 dated Aug. 8, 2018, 5 pages.
International Search Report received in corresponding PCT Application No. PCT/CA2018/050822 dated Aug. 9, 2018, 3 pages.
Written Opinion of the International Searching Authority received in corresponding PCT Application No. PCT/CA2018/050822 dated Aug. 9, 2018, 5 pages.

* cited by examiner

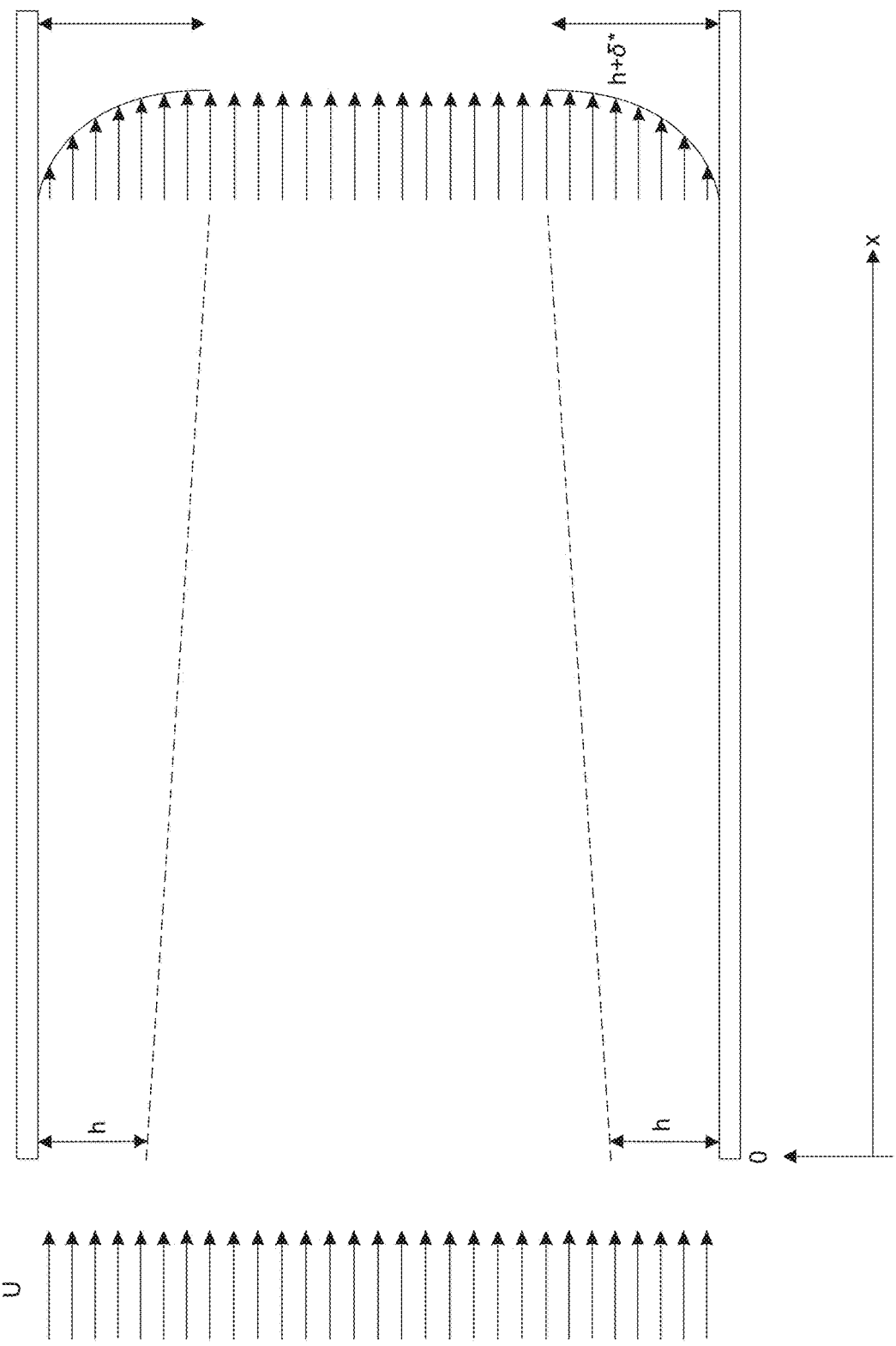

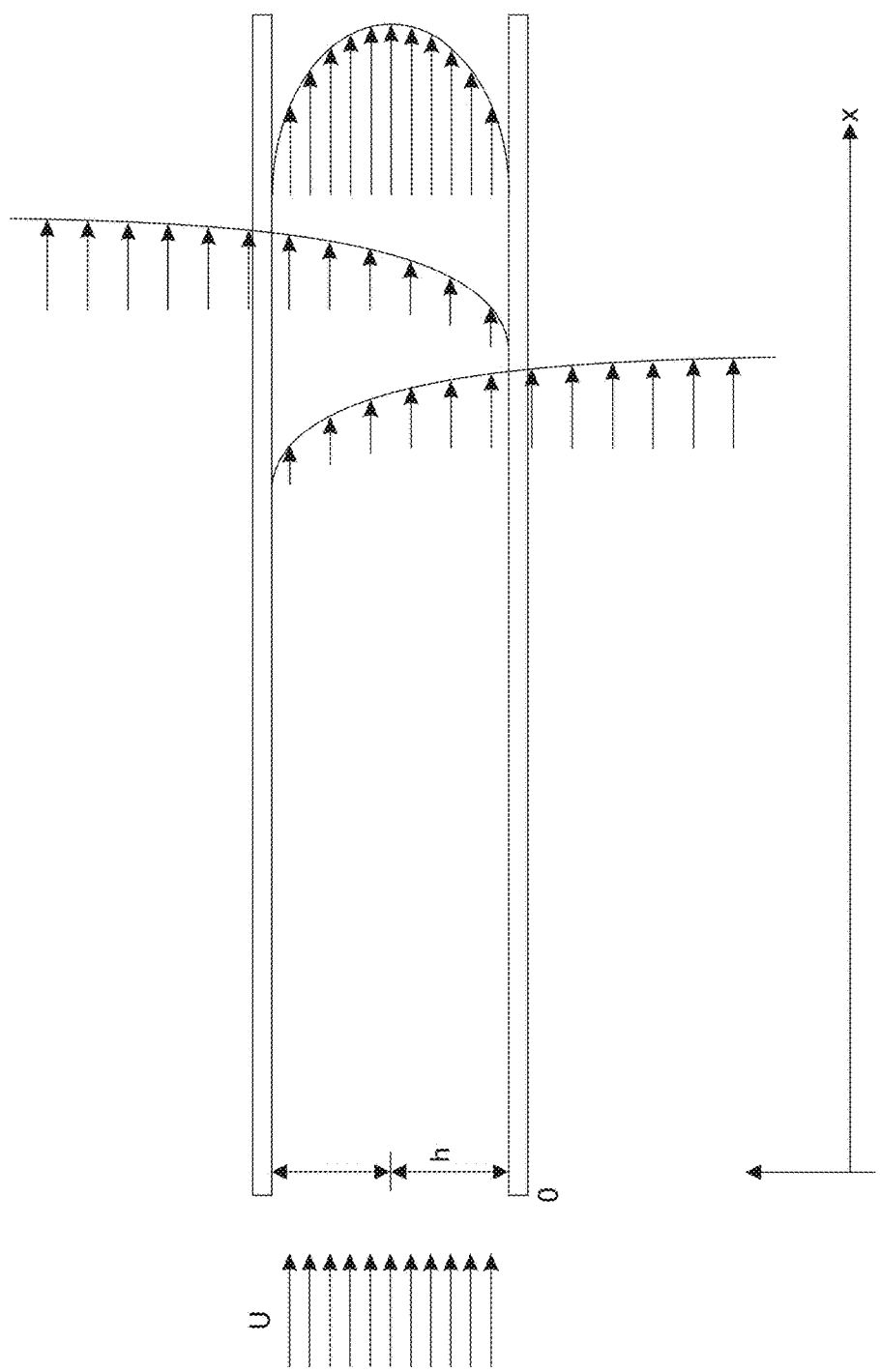

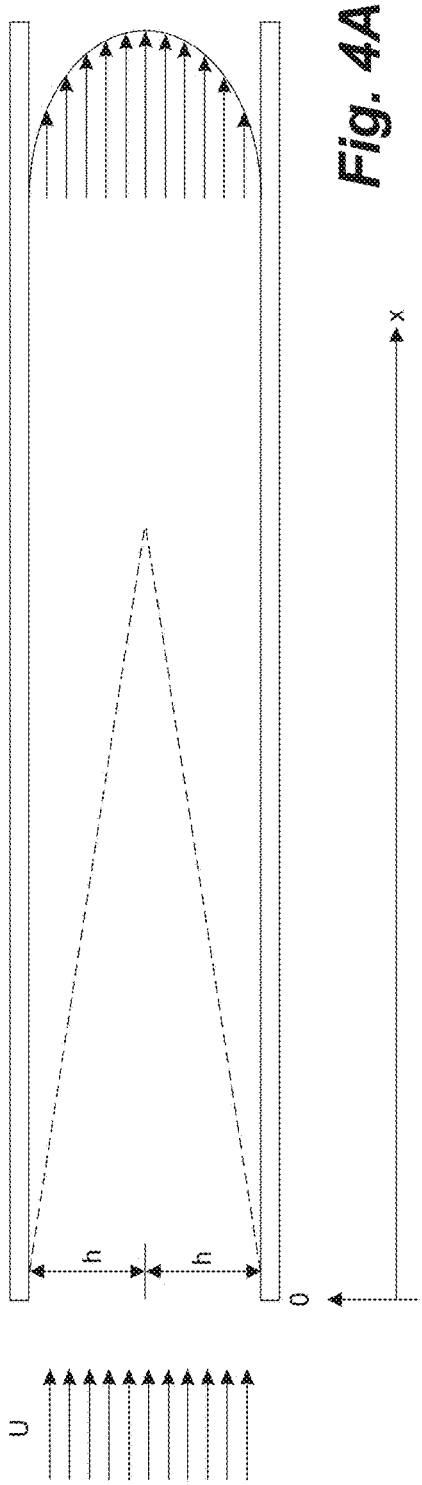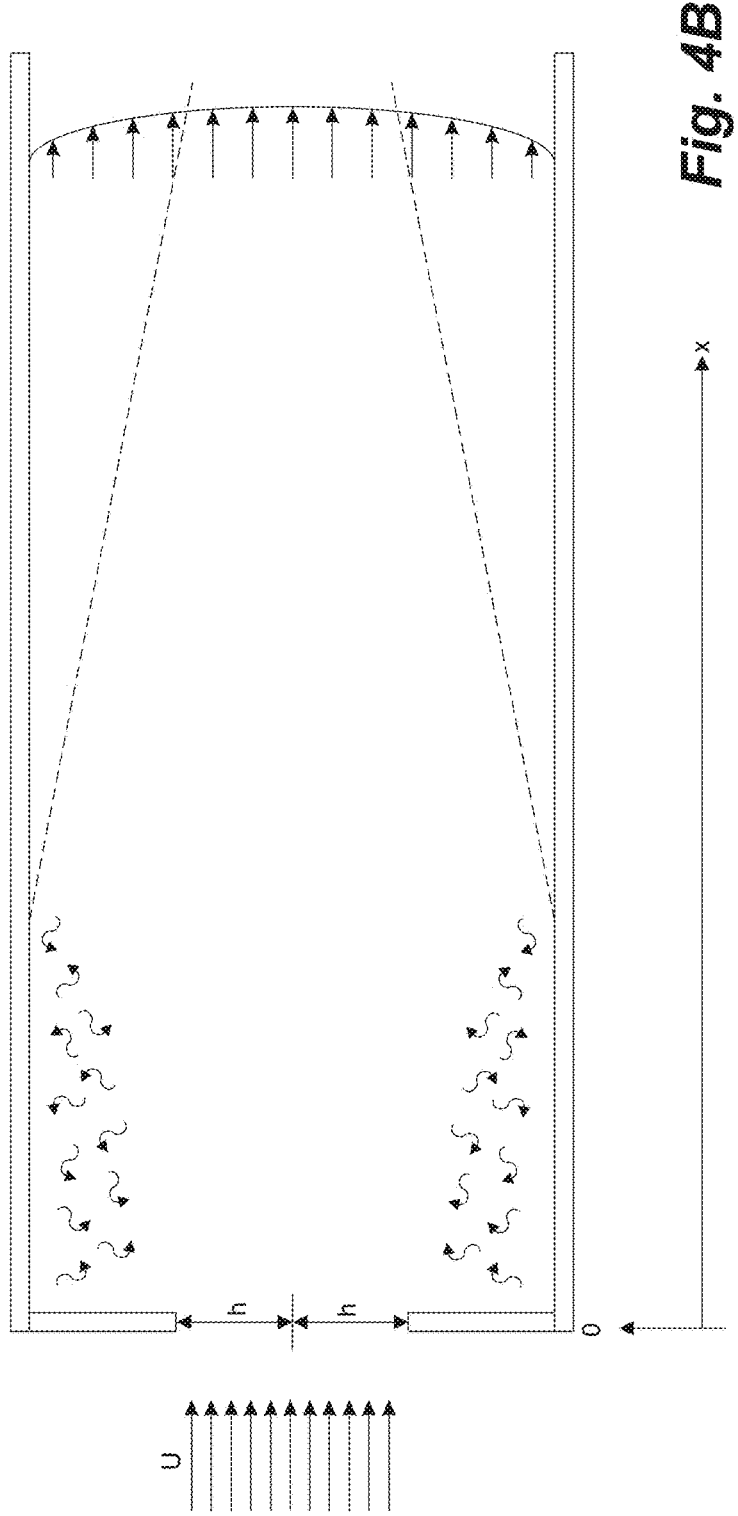

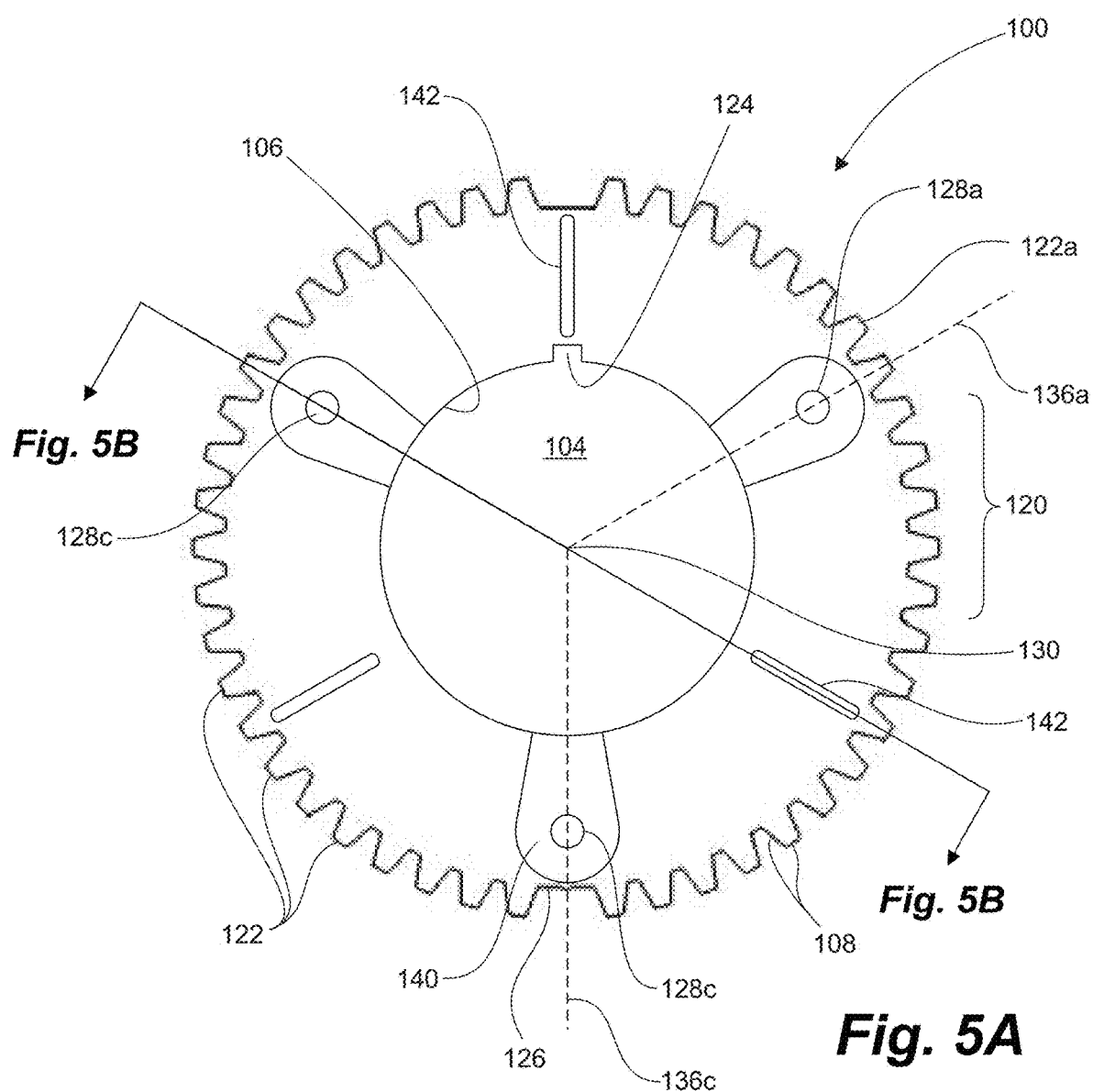
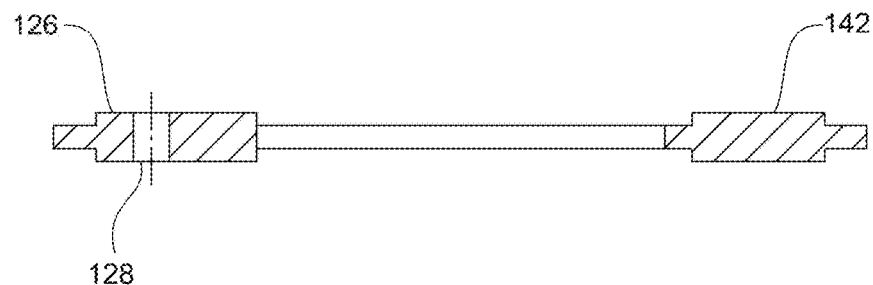
Fig. 5A
Fig. 5B

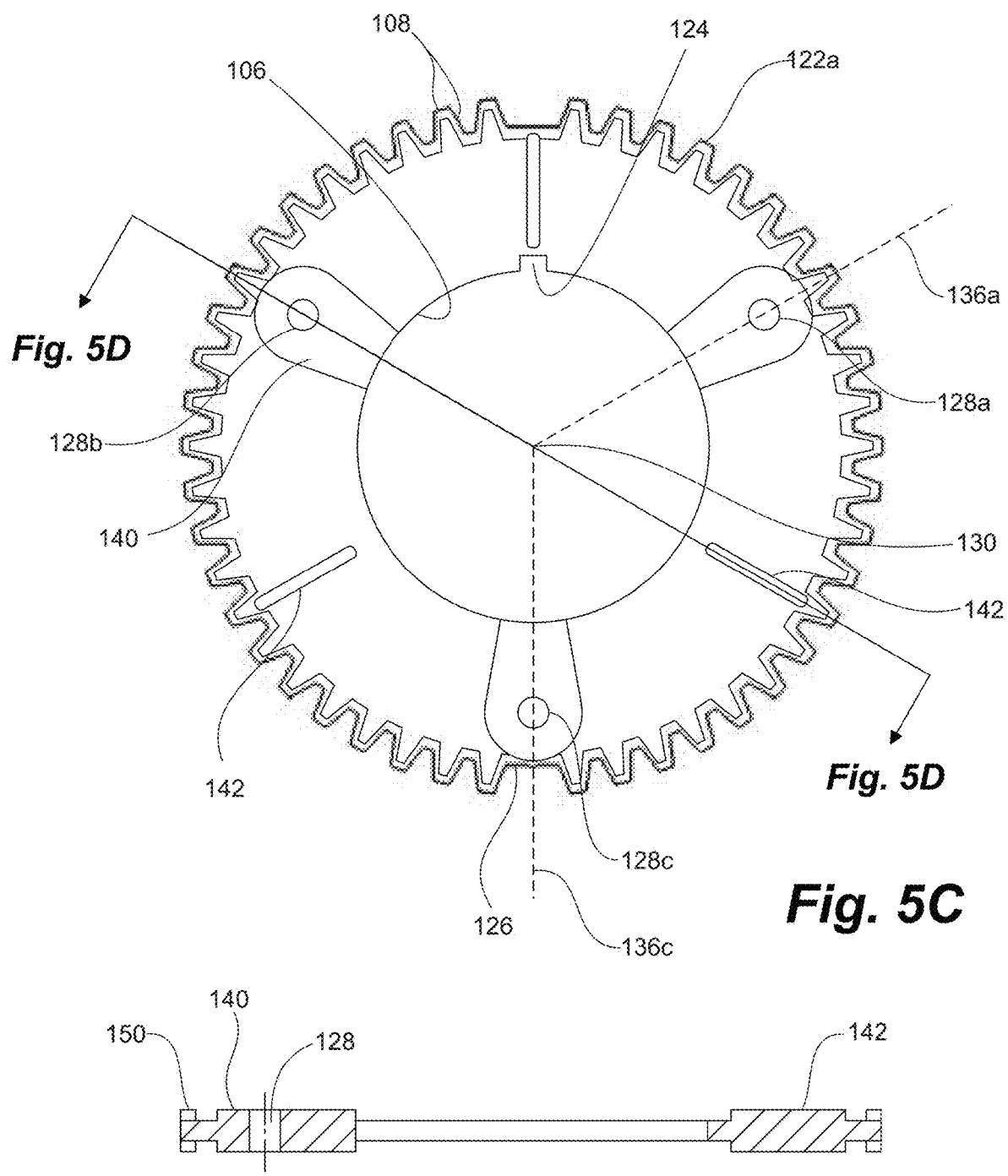

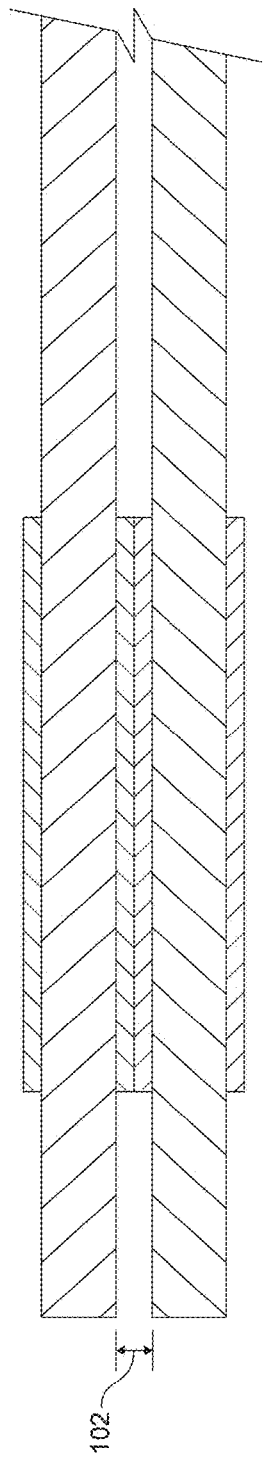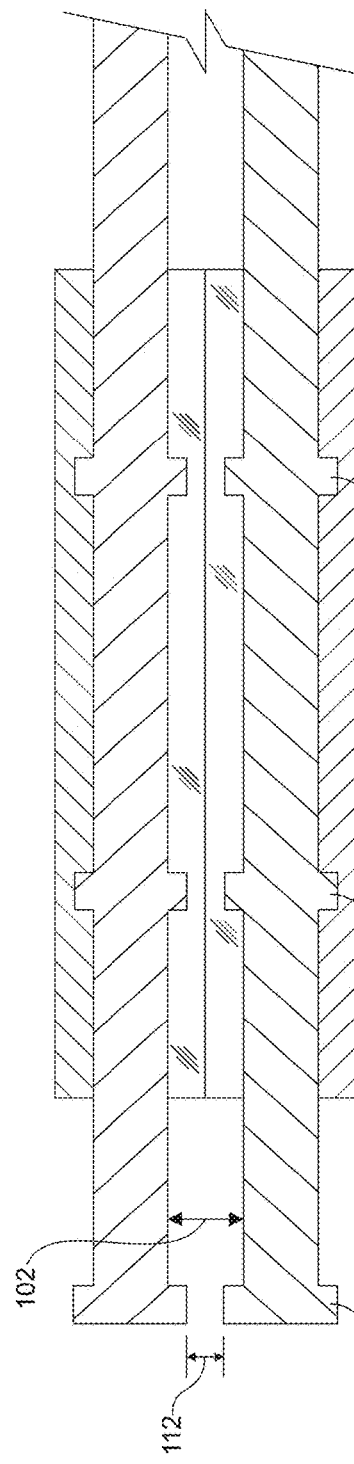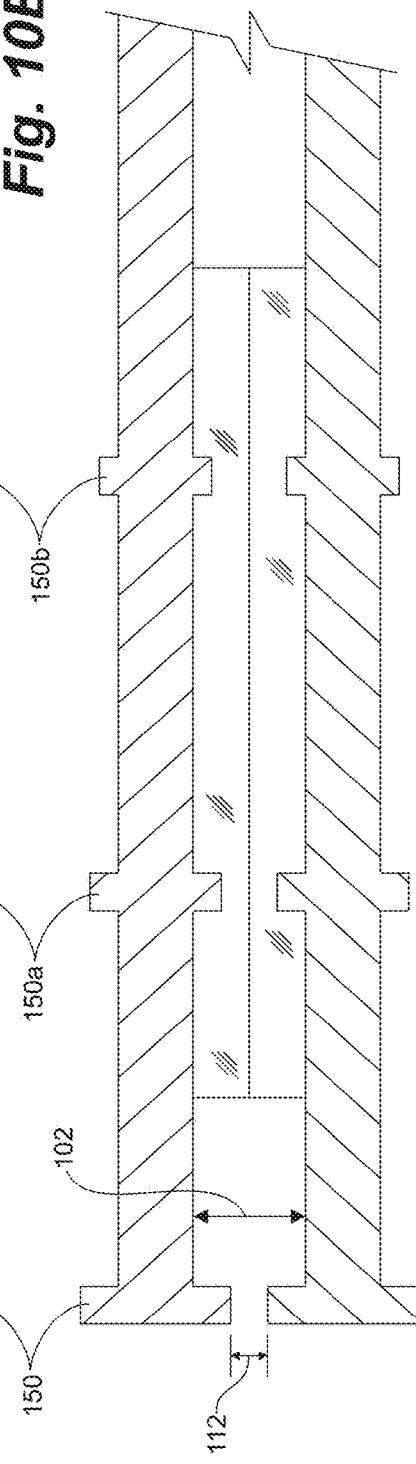

BOUNDARY LAYER MODIFICATION IN CLOSELY-SPACED PASSAGES

CROSS-REFERENCE TO RELATED APPLICATIONS

This application claims the benefit of U.S. Provisional Application No. 62/529,309, filed Jul. 6, 2017, and is a Continuation-In-Part of U.S. patent application Ser. No. 15/991,771, filed May 29, 2018, and further U.S. Ser. No. 15/991,771 claims the benefit of U.S. 62/512,600, filed May 30, 2017, all which are incorporated herein by reference in their entirety.

FIELD

The present disclosure relates generally to an apparatus and a method for removing particulates, especially sand, from multiphase fluid streams. In particular, it relates to a filtering device having stacked plates, wherein the plates comprise a lip that modifies the boundary layer formed by fluids passing along the plates, so as to allow closer spacing of the stacked plates.

BACKGROUND

Production from wells in the oil and gas industry often contains particulates, such as sand. This sand could be part of the formation from which the hydrocarbon is being produced, introduced from hydraulic fracturing, fluid loss material from drilling mud or fracturing fluids, or from a phase change of produced hydrocarbons caused by changing conditions at the wellbore (asphalt or wax formation). As the sand is produced, problems occur due to abrasion and plugging of production equipment. In a typical startup, after stimulating a well by fracturing, the stimulated well may produce sand until the well has stabilized, often lasting for several months after production commences. Other wells may produce sand for a much longer period of time.

Erosion of the production equipment can be severe enough to cause catastrophic failure. High fluid stream velocities are typical and are even purposefully designed for elutriating particles up the well and to the surface. An erosive failure of this nature can become a serious safety and environmental issue for the well operator. A failure, such as a breach of high pressure piping or equipment, releases uncontrolled high velocity flow of fluid which is hazardous to service personnel. Releasing such fluid to the environment is damaging to the environment resulting in expensive cleanup and loss of production. Repair costs are also high.

In all cases, retention of sand contaminates surface equipment and the produced fluids and impairs the normal operation of the oil and gas gathering systems and process facilities. Therefore, desanding apparatus are required for removing sand from the fluid stream. Due to the nature of the gases handled, including pressure and toxicity, all vessels and pressure piping in desanding apparatus must be manufactured and approved by appropriate boiler and pressure vessel safety authorities.

Trends in the fracturing industry have evolved to where the amount of sand pumped downhole is now in the order of 10,000 tonnes (20 million pounds) per well in multi-stage fractures. Correspondingly, the amount of sand produced in flow back operations has increased and it is not unusual for a well to produce 50 tonnes (100,000 pounds) of sand. Desanding capabilities must increase accordingly.

It is known to employ filters to remove sand, including fiber-mesh filter bags that are placed inside a pressure vessel. The density of the filter bag fiber-mesh is matched to the anticipated size of the sand. Filter bags are generally not effective in the removal of sand in a multiphase condition. Usually multiphase flow in the oil and gas operations is unstable. Large slugs of fluid followed by a gas mist are common. In these cases, the fiber-mesh bags can blind off, becoming a major cause of pressure drop and they often fail due to the liquid presence. Thus, filter bags are avoided in critical applications and due to cost associated with replacement and subsequent disposal as contaminated waste.

Other prior-art apparatus use plate filters and/or screens for removing sand from an input fluid stream. For example, stacked plate or multiple-disc type filters are known, such as in U.S. Pat. No. 4,753,731 to Drori, and US application US2015/0144546, published May 28, 2015, each of which disclose a plurality of paired, cooperating disc-like filter surfaces. Such designs are designed to form annular pockets between adjacent discs for receiving and holding foreign particles separated from the fluid. As stated by Drori, multiple-disc filters have a number of advantages over the apertured screen type including removal and retention of higher quantities of foreign particles, and higher resistance to damage. However, these prior-art desanding apparatus have drawbacks such as low or even marginal tolerance for pressure drop, and usually physically collapse at differential pressures as low as about 100 psi. Another drawback of such prior-art devices is that the screens thereof are easily plugged or clogged due to the accumulation of sand thereon.

Applicant's U.S. patent application Ser. No. 15/835,039, filed Dec. 7, 2017 and published as US 2018-0161705A1 on Jun. 14, 2018, describes a stacked plate filter for filtering out sand from a fluid, which comprises parallel, closely-spaced plates suitable for excluding sand of a particular diameter. The cross-sectional dimension of the passages through which a fluid is conducted, such as the walls of spaced stacked plates in a filter, is typically sized to exclude sand and minimize pressure drop, which also happens to result in opposing wall spacing that is far greater than the sum of the approaching boundary layer displacement from each wall for the fluid being filtered.

The closer together that the stacked plates are spaced, the smaller is the particulate that can be excluded from the space between the plates. However, Applicant notes a problem arises in spacing the plates closer together when the fluid being filtered was a liquid. As plate spacing decreased, for a given fluid flow rate, the pressure drop was been observed to increase beyond that of the theoretical. Clearly, the characteristics of liquid, as the process fluid, behaved significantly differently from gaseous fluids.

Therefore, there is a need to further improve the efficiency of separating smaller particulates from a multiphase fluid in a stacked-plate filter.

SUMMARY

Applicant has determined that the flow of fluids between closely-spaced walls, such as stacked plate filters, can be subject to significant and deleterious effects related to the fluid mechanics of the fluid flowing therethrough. Applicant believes these are due to boundary layer effects, as referred to hereinafter.

Disclosed herein is an apparatus and method to mitigate these boundary effects and enable closer spacing of walls, such as walls of stacked plate filters than was previously possible, while still allowing flow of fluid therebetween.

In embodiments, the development of the boundary layer displacement is modified to be less than ½ the design spacing in a passage and reduce compensatory increases in the free stream velocity for maintaining like mass flow therethrough over a given length of the passage. More particularly, at least the entrance to the passage is fit with an inward weir or lip for forming an inlet spacing and the passage downstream having a greater spacing therebetween.

In one aspect, disclosed is a stacked-plate apparatus having at least one pair of adjacent plates stacked along an axis, each plate of the pair comprising a first edge and a second edge, said adjacent plates having opposing surfaces that are parallel to one another and spaced apart axially to form a flow passageway for flow of fluid therethrough from a fluid inlet formed by the first edges of the at least one pair of adjacent plates, to a fluid outlet formed by the second edges of the at least one pair adjacent plates. At least the first plate of the at least one pair of adjacent plates has a first lip at the first edge, the first lip extending axially into the flow passageway at the fluid inlet, thereby narrowing the flow passageway at the fluid inlet to form an inlet gap. The first lip is configured to enhance the flow of a fluid towards the fluid outlet, for at least a working distance downstream thereof, as compared to a pair of adjacent plates that does not have the first lip.

Fluid, as used herein includes liquids and gases. "Gases" includes without limitation air, nitrogen, carbon dioxide, carbon monoxide, methane, ammonia, hydrogen chloride, nitrous oxide, nitrogen trifluoride, sulphur dioxide and sulphur hexafluoride. "Liquids" as used herein includes, without limitation water in all its forms, for example fresh water, salt water, wastewater, brine and process water, liquid hydrocarbons such as heavy (e.g., bitumen), medium and light crude oils, alcohol, mercury, glycol, liquid metals.

In embodiments of the apparatus the second plate of the at least one pair of adjacent plates comprises a second lip around the first edge of the second plate, the second lip extending axially into the flow passageway at the fluid inlet and the second lip is configured to enhance the flow of fluid towards the fluid outlet, for at least a working distance downstream thereof, as compared to a pair of adjacent plates that does not have the second lip.

In embodiments of the apparatus, the first lip and/or second lip has a planar surface that is generally coplanar with the opposing surfaces of the plates.

In embodiments of the apparatus, the first lip and/or second lip is rectangular in cross section.

In embodiments of the apparatus, the first edge is an undulating edge of the plate, and in embodiments the undulating edge is a pleated edge.

In embodiments of the apparatus, the first lip and/or the second lip is continuous around the entire first edge of the plate.

In embodiments of the apparatus, the first lip and the second lip are opposite one another at the fluid inlet.

In embodiments the inlet gap is 100 µm or less across and/or the opposing surfaces of the at least one pair of adjacent plates are spaced apart by 200 µm or more.

In another aspect, described herein is a stacked-plate filter has a plurality of plates stacked along an axis and adjacent one another, each plate comprising a central opening forming an inner edge about the axis and an outer periphery forming an outer edge, said plates being parallel to one another with the upper and lower planar surfaces of adjacent plates spaced apart to form a flow passageway therebetween for flow of fluid therethrough. The filter has a fluid inlet at the outer edges of adjacent plates; and a fluid outlet at the inner edges of adjacent plates.

The upper surface of each of the plates has an upper lip around the outer edge of the plate and extending axially from the upper surface, the lower surface of each of the plates has a lower lip around the outer edge of the plate and extending axially from the lower surface and the upper and lower lips of adjacent plates oppose one another at the fluid inlet to form an inlet gap.

The upper and lower lips are dimensioned to enhance the flow of a fluid towards the fluid outlet, for at least a working distance downstream thereof, as compared to a pair of adjacent plates that does not have the upper and lower lips.

In embodiments of the filter the upper and/or lower lip has a planar surface that is generally coplanar with the upper and/or lower surface of the plate, respectively.

In embodiments of the filter the upper and/or lower lip is rectangular in cross section.

In embodiments of the filter the outer edge of each plate is a radially undulating edge, such as a pleated edge.

In embodiments of the filter the upper and/or lower lip is continuous around the entire outer edge of the plate.

In embodiments of the filter the inlet gap is 100 µm or less across and/or the upper and lower surfaces of adjacent plates are spaced apart by 200 µm or more.

In another aspect described herein is a method of enhancing the flow of a fluid through a stacked plate filter that comprises a plurality of plates stacked along an axis and adjacent one another, said plates being parallel to one another with the upper and lower planar surfaces of adjacent plates spaced apart to form a flow passageway having parallel sides therebetween, for flow of fluid therethrough from a fluid inlet to a fluid outlet, the method comprising narrowing the flow passageway at the fluid inlet, to enhance the flow of fluids along the passageway.

BRIEF DESCRIPTION OF THE DRAWINGS

Various of the drawings below set forth arrangements of features affecting at least fluid flow and structure considerations which can vary according to the process design considerations, and unless specifically noted, proportions illustrated thereon are not necessarily to scale.

FIG. 2 is an illustration of the effect of the minimal Blasius boundary layer effect for parallel plates spaced sufficiently apart for formation of a typical free stream formed therebetween;

FIG. 3 is an illustration of the overwhelming effect of Blasius boundary layer for parallel plates spaced very close together where the displacement, shown fancifully beyond the wall dimensions, exceeds ½ of the spacing between the plates, a free stream unable to be formed therebetween;

FIG. 4A illustrates the closely-spaced plates of FIG. 3 with a stream flow fully influenced by boundary layer effects;

FIG. 4B illustrates a first general embodiment of a design for boundary layer manipulation between in closely-spaced plates for establishing free stream flow therebetween, the opposing plates fit with trip lips;

FIGS. 5A and 5B are plan view and cross-sectional side views of a plate respectively;

FIGS. 5C and 5D are plan view and cross-sectional side views of a plate fit with peripheral trip lips, the trip lips sized for demonstrating their location, not necessarily their relative proportions to the plate and plate-to-plate spacing;

FIGS. 10 through 10C each illustrate side cross-sectional views of opposing plates, more particularly:
  two opposing plates absent any trip lips
  two opposing plates having optionally two or more radially spaced trip lips of like height; and
  two opposing plate having option two or more radially spaced trip lips of diminishing height;

DESCRIPTION

In testing a stacked plate filter, such as that disclosed in Applicant's US patent application US 2018-0161705A1 and published on Jun. 14, 2018, when plates were spaced about 100 µm apart, pressure drop across the plates rose sharply with increased flow rate of water therethrough. At 75 µm plate spacing, fluid flow was established, but it was unstable. And as time progressed, pressure drops climbed, and after a number of start-stop tests flow therethrough could no longer be established. The filter was essentially blocked. At 50 µm plate spacing, flow of water through the plates could not be established at all. As verification that the plates were in fact open and not blocked with particulate matter, air was pumped successfully through the plate filter with expected pressure drops thereacross.

While initially attributed to fluid viscosity and surface tension, Applicant has determined that the development of a boundary layer within the plate filter plays a dominant role in the flow performance of a plate filter. The displacement effect of the boundary layer causes a small but finite displacement of the outer fluid streams spaced from the wall.

Figure 1:
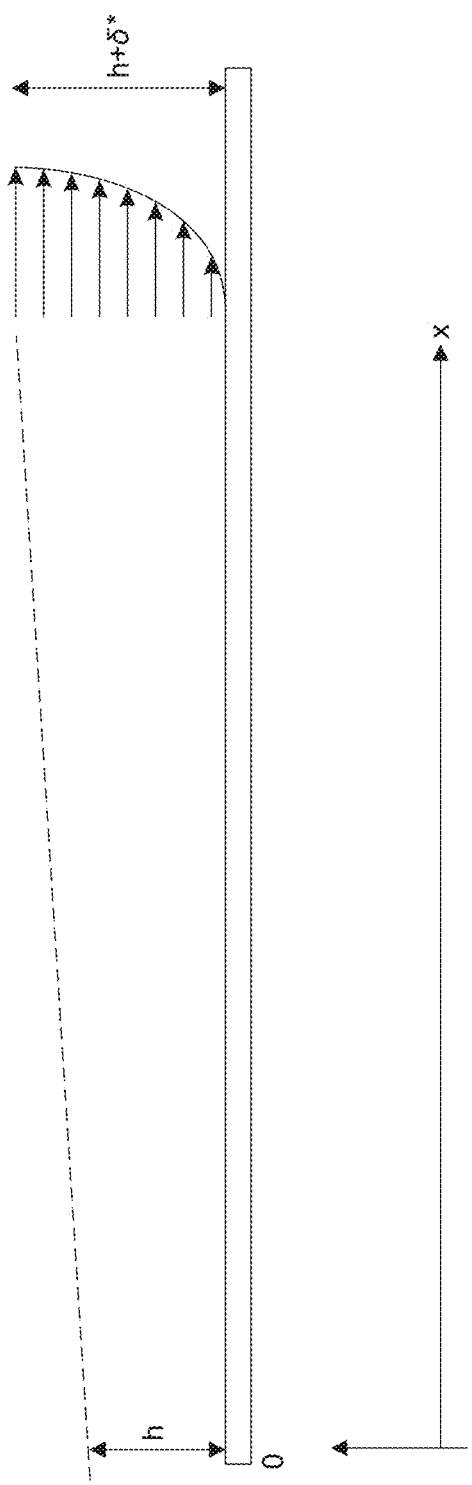
FIG. 1 is an illustration of the displacement effect of the Blasius laminar boundary layer formed on a semi-infinite plate, from zero velocity to about 99% of free stream mean velocity.

With reference to FIG. 1, the general behaviour of fluids flowing over a flat plate is shown. The solution to boundary layer displacement (dashed line) was given by Blasius in 1908 and is illustrated in FIG. 1. In our case of using closely-spaced stacked plates to create a filter where the spacing is measured in microns, Applicant has determined that the boundary layer displacement becomes important, because the boundary layer displacement is as large or larger than the plate spacing (measured in microns), and the plates confine the space where a boundary layer is not allowed to grow to extent of the Blasius displacement.

As shown in FIG. 2, in a normal case of designing a passage for fluid flow for a low pressure drop therealong, opposing plates are spaced sufficiently apart such that the normal boundary layer displacement (dashed line) is less than the mid-point between the plates and the displacement, to about 99% of the free stream mean velocity, is achieved.
Closely-Spaced Plates for Filtering In other design cases, where filtering is the driving factor, the plates are arranged in a more closely-spaced manner, to exclude particulates and the displacement is constrained. As shown in FIG. 3, for a given fluid flow, the normal boundary layer displacement is shown fancifully for each plate. Note that the extent of the displacement, generally deemed to be about 99% of the free stream mean velocity of the fluid, happens to be larger than the spacing of the plates when arranged in such closely-spaced and opposing fashion.

In FIG. 4A therefore, when the flow stream is bounded between two plates, and not allowed to grow due to boundary layer displacement, the resulting flow streams would need to show a significant increase in velocity in the flow streams away from the plates to accommodate boundary layer growth and preserve momentum. In most circumstances with widely spaced passages, boundary layer effect is small and often ignored for flow design considerations. In the case of the flow through the closely-spaced passages of a plate filter, boundary layer effect is the dominant factor in the plate design.

With reference to FIGS. 5A, 5C, 6, 13, 14A, generally, a plurality of plates 100 are stacked one adjacent the other in parallel, yet spaced, arrangement. Each plate is generally planar and each pair of plates 100,100 forms a generally uniform passageway or gap 102 therebetween, forming a plurality of gaps 102,102. Each of the plates can have a central opening 104 for receiving a perforated fluid receiving pipe forming a fluid path coupled to a fluid outlet or fluid inlet (not shown; a form of which is described in Applicant's co-pending U.S. patent application Ser. No. 15/835,039, published as US 2018-0161705A1 on Jun. 14, 2018, which is incorporated herein by reference in its entirety).

Figure 7C:
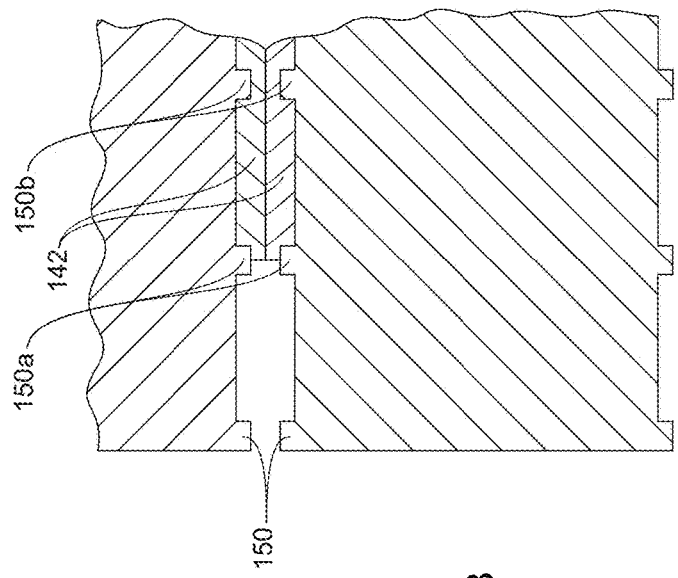
FIG. 7C is a partial cross-section side view of the periphery of opposing plates, the view expanded to illustrate approximate relative proportions of one or more trip lips and plate bosses.
Figure 7A:
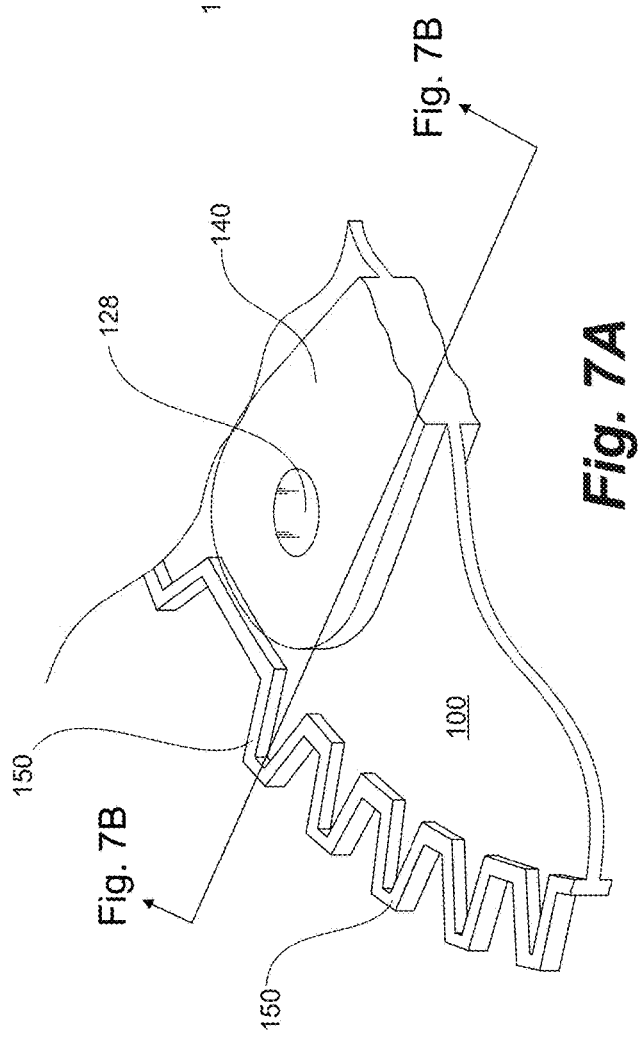
FIG. 7A is a partial perspective view of a plate fit with peripheral trip lips and a spacing boss.

The opening has inner edge 106 forming an inner diameter (ID) of the plate, and an outer periphery of the plate has an outer edge 108 forming an outer diameter (OD) of the plate. In embodiments with teeth 122, the outer edge 108 is the edge around and between the individual teeth 122 as shown in FIG. 7A, and the OD is formed by an imaginary perimeter that coincides with the tips of the teeth. Gaps 102 communicate the fluid passing therethrough radially from in-to-out (inner edge to outer edge) or out-to-in (outer edge to inner edge).

Typically the central opening 104 is fluidly connected to one of a fluid inlet or fluid outlet depending on the flow direction. If the central opening 104 is a fluid inlet, the inner edge, which is fluidly connected to the fluid inlet, forms a gap interface. In embodiments, the outer edge is fluidly connected to the fluid inlet, forming the gap interface, for flow through the stack from the outer edge to the inner edge and the fluid outlet.

The size of the gap 102 between each pair of adjacent plates 100,100 is sized to exclude particulates from entering therein. When flowing in-to-out, the respective pairs of adjacent inner edges 106 exclude particulates from entering the gap 102 between adjacent plates and flowing along the gap. When flowing out-to-in, the respective pairs of adjacent outer edges 108 exclude particulates from entering the gap 102 between adjacent plates and flowing along the gap.

Referring to FIGS. 4A, 5A, 5B, 8 and 10A, as an example, a filter stack of eight hundred (800) opposing, parallel and closely-spaced plates 100,100 . . . was assembled. Each plate was 152 mm OD×76 mm ID (6"×3"), with a tooth length of about 7 mm, and each pair of plates was spaced 100 µm apart. A flow of water was passed through the filter stack from the outer edge to the inner edge at a flow rate of 1000 m3/day. Assuming unbounded flow, the estimated boundary layer displacement thickness for each plate was about 600 µm. For the plates spaced 100 µm apart therefore, the interplate interference would be less than the at ½ the plate spacing, or 50 µm. Thus, as shown in FIG. 3, the boundary layer displacement thickness would be 12 times the plate spacing, inferring boundary layer interference. The Blasius equation for laminar flow is inversely proportional to the square root of the Reynolds number which implies that it would be inversely proportional to the square root of the fluid stream velocity. To solve this for the test conditions, a velocity of close to the speed of sound would be needed to accommodate the boundary layer growth. This analysis suggests why the 75 µm plate spacing test were unstable and the 50 µm tests were unable to establish any flow of liquid therethrough.

Figure 8:
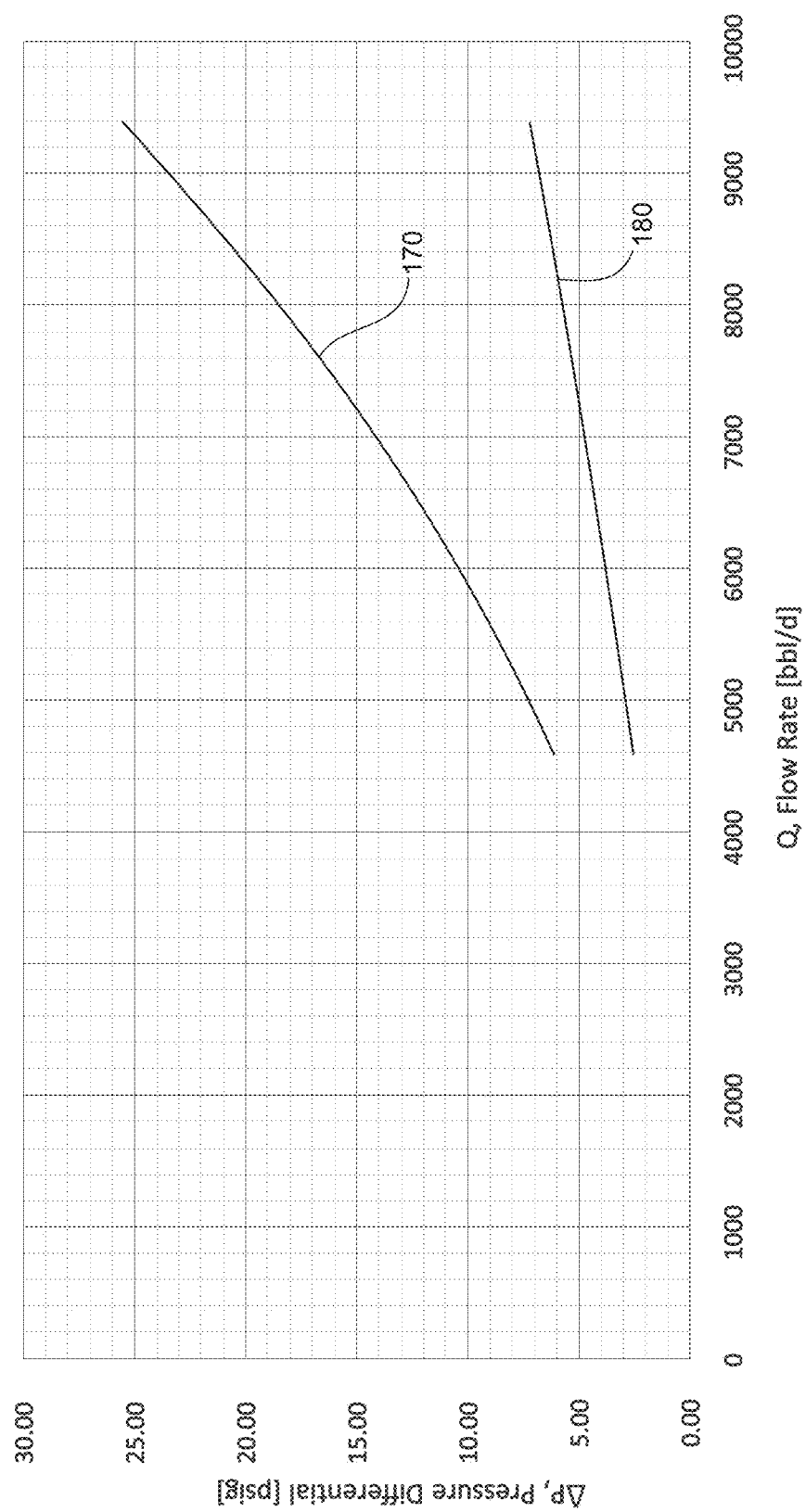
FIG. 8 is a graph illustrating the performance of the change in pressure drop between two plates, with and without trip lips, for a range of flow rates of water therethrough.
Figure 9:
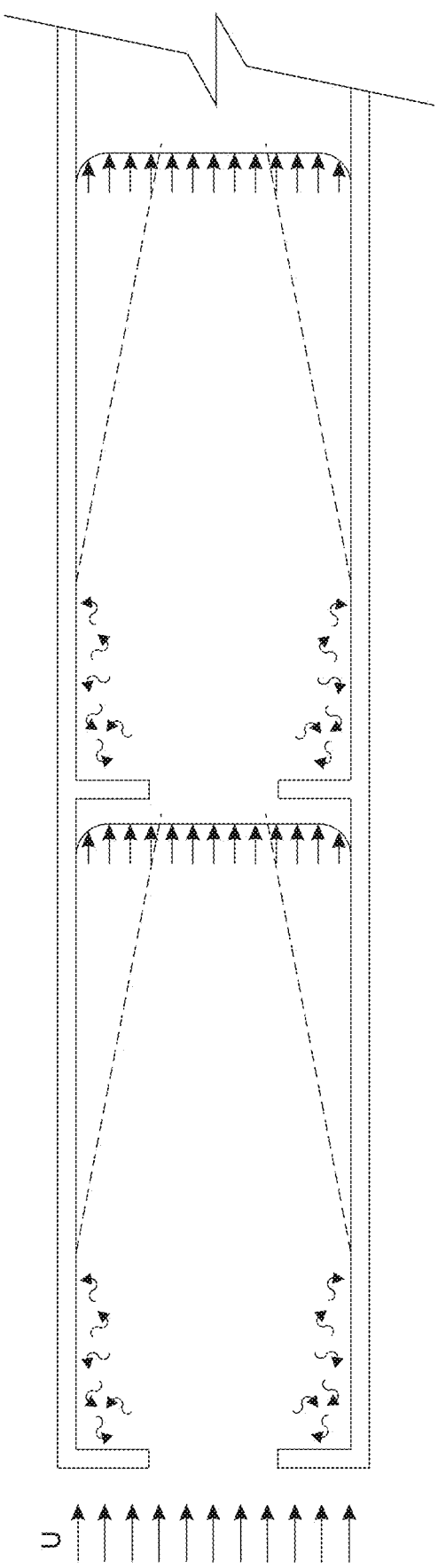
FIG. 9 illustrates radially spaced trip lips to manipulate the boundary layer downstream of the outermost lip and again, downstream of a second trip lip before the boundary layer displacement re-establishes across the flow gap.

As shown in FIG. 8, in upper curve 170 for the above arrangement, as the flow rate doubles from about 730 m3/d (4600 bbl/d) to about 1500 m3/d (9400 bbl/d), the pressure drop across the filter stack increases by a factor of about five times (6 to 26 psig).

While the development of a boundary layer requires a compensatory increase in the free stream velocity, the embodiments herein significantly reduce the extent to which velocities increase and pressure drops increase.

Edge Misalignment

In the prior art, each plate of a stack of plates had been of like design, resulting in coincident inner and outer edges, aligning along a perpendicular to the plane of the plates. In other words, when the plates happen to be stacked vertically and secured together for use, all the inner and outer edges aligned vertically. As described in Applicant's co-pending US published patent application US 2018-0161705A1, Applicant noted that with this prior art arrangement, individual particles are often received and become lodged along the aligned and spaced edges of the gap interface, the aligned edges of the plates imposing retaining forces. In US published patent application US 2018-0161705A1, Applicant disclosed a stacked plate filter with misalignment of the respective and adjacent inlet edges to mitigate particle retention and clogging at the filter gap interface. A slight misalignment of the edges at the gap interface, such as that being less than the particle radius, disables opposing frictional jamming forces that retain particulates.

Further, as shown in FIG. 5A, each plate 100 has a peripheral pleated edge 120 for increasing the surface area thereof and, in embodiments, aids in angular misalignment. For example, each plate 100 is a gear-like plate having a plurality of teeth 122 about the edge thereof. In this embodiment, the central opening 104 is keyed by having a keyed notch (keyway) 124 to provide alignment in addition to the alignment provided by three assembly rods (described later) for extra rigidity.

Figure 6:
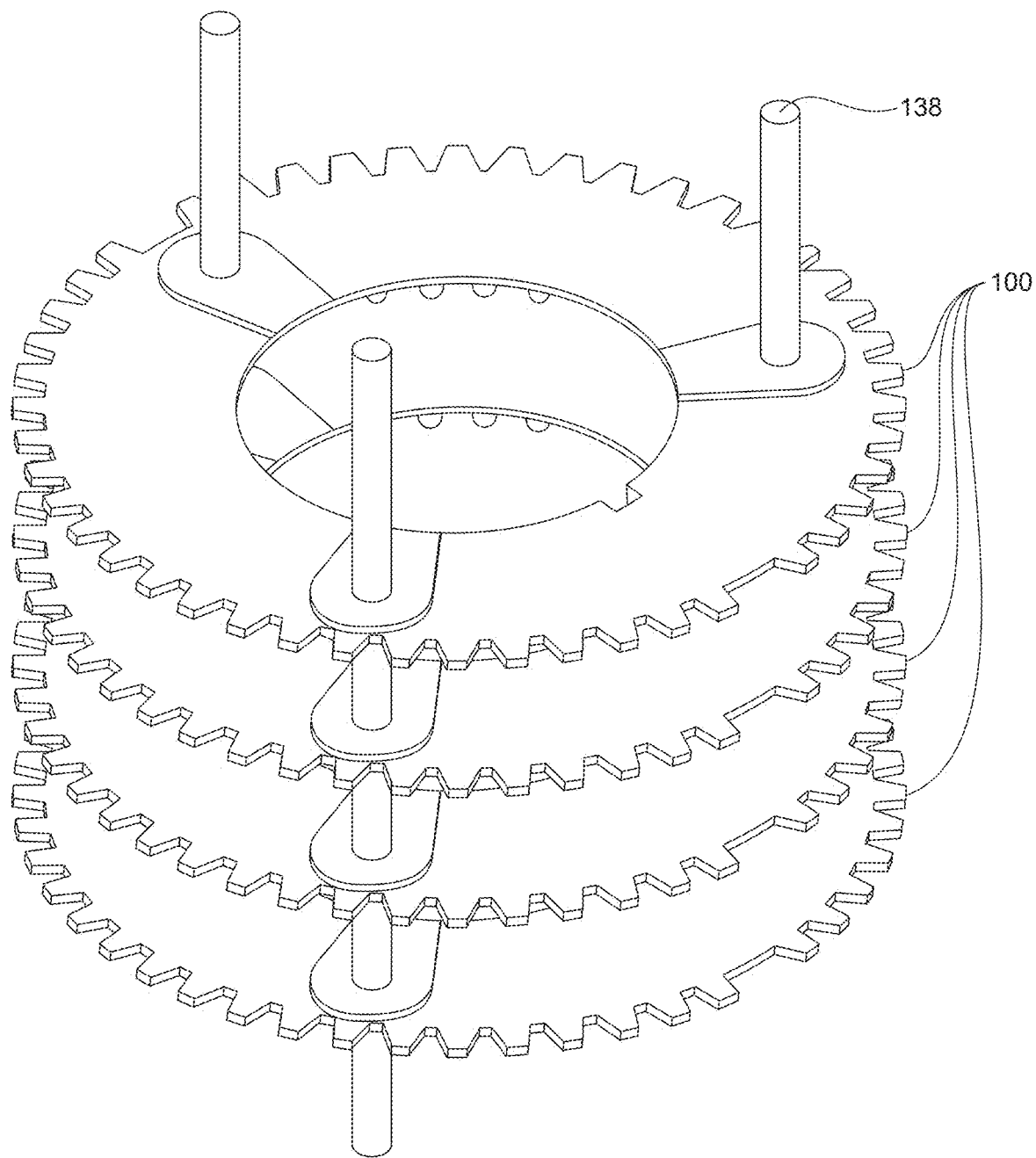
FIG. 6 is a perspective view of filter plates of FIG. 5A, 5B shown in the process of alignment in a stack, the plates not yet arranged in a facing, engaged position.
Figure 13A:
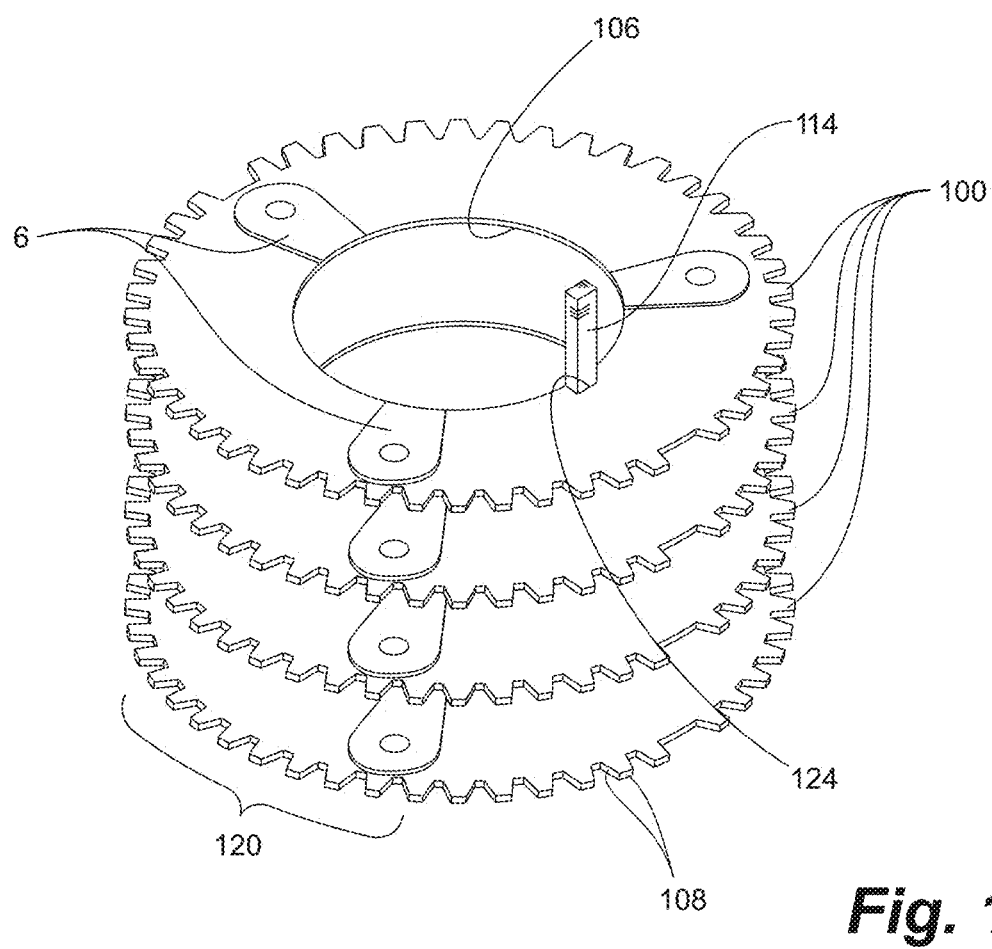
FIGS. 13A and 13B are perspective views of four filter plates in axially exploded view and an operationally stacked view respectively, with plate bosses providing inter-plate spacing therebetween.
Figure 13B:
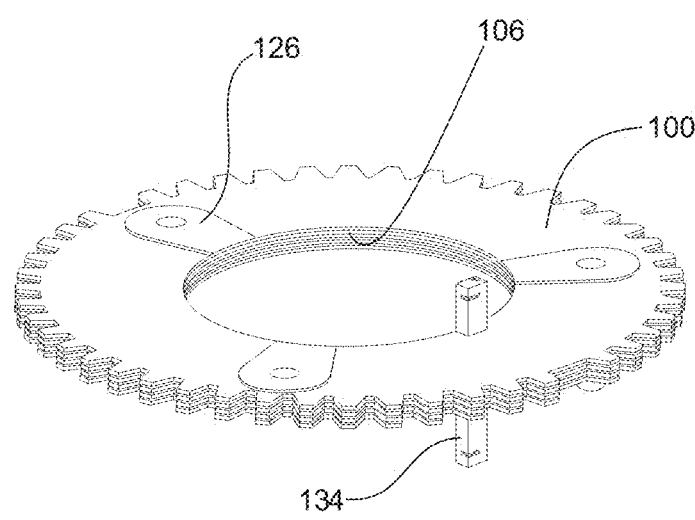

Each plate 100 may also comprise a plurality of alignment holes 128 for coupling to assembly rods 138 as part of the assembly apparatus, as shown in FIG. 6. For example, in this embodiment, the plate 100 comprises three alignment holes 128A, 128B and 128C. A portion of the plate in proximity with each alignment hole 128 has an increased thickness forming a raised-face area or boss 140 on at least one side, but which can also be on both sides of the plate 100, for providing required spacing between plates when assembled. While the alignment holes 128 and rods 138 aid in assembly, the fine tolerance of the lip misalignment for particle rejection relies on more precise angular alignment of adjacent plates. As shown in FIGS. 6, 13A and 13B, the stack of plates are fit to a centre generally cylindrical mandrel. The keyed notch 124 in each of the plates aligns angularly with a key on the mandrel. The assembly rods 138 then can be provided with sufficient tolerance to avoid jamming during assembly or omitted in their entirely.

In this embodiment, the teeth 122 are generally of the same size and circumferentially uniformly distributed. Each tooth 122 is symmetrical to a central axis thereof (not shown). As shown in FIG. 5A, in embodiments, the plate 100 may be absent of one or more teeth for alignment and/or identification purposes.

In this embodiment the three alignment holes 128A, 128B and 128C are located on the plate 100 at a same distance from the center 130 (denoted "origin" hereinafter) of the plate 100, and at 120° to each other with respect to the origin 130. Further, the alignment holes 128 are positioned such that, for each alignment hole 128, the tooth 122, or the notch 1126 if the tooth faces a notch, adjacent thereto is asymmetrical with respect to an imaginary line between the origin 130 and the center of the alignment hole 128. In other words, the imaginary line between the origin 130 and the center of the alignment hole 128 is offset from the central axis of the adjacent tooth 122. For example, the tooth 122A adjacent to the alignment hole 128A is asymmetrical to the imaginary line 136A between the origin 130 and the center of the alignment hole 128A. The tooth 128C faces a notch 126, which is asymmetrical to the imaginary line 136C between the origin 130 and the center of the alignment hole 128C. Such asymmetry of the teeth 122 results in different patterns of the front and rear faces of the plate 100, in terms of the tooth positions relative to the alignment holes, and gives rise to angular offset between filter plates 100 after assembling.

As shown in FIG. 6, during assembly, a plurality of filter plates 100 are stacked with the alignment holes thereof aligned for receiving assembly rods 138, each plate arranged alternatingly "facing-up" and "facing-down". Herein, filter plates are alternatingly "facing-up" and "facing-down" in that the first or front faces of each pair of adjacent filter plates 100 are facing opposite directions such that among any three adjacent filter plates, the first faces of the first and third plates face the same direction and the first face of the middle plate faces the opposite direction.

Figure 11:
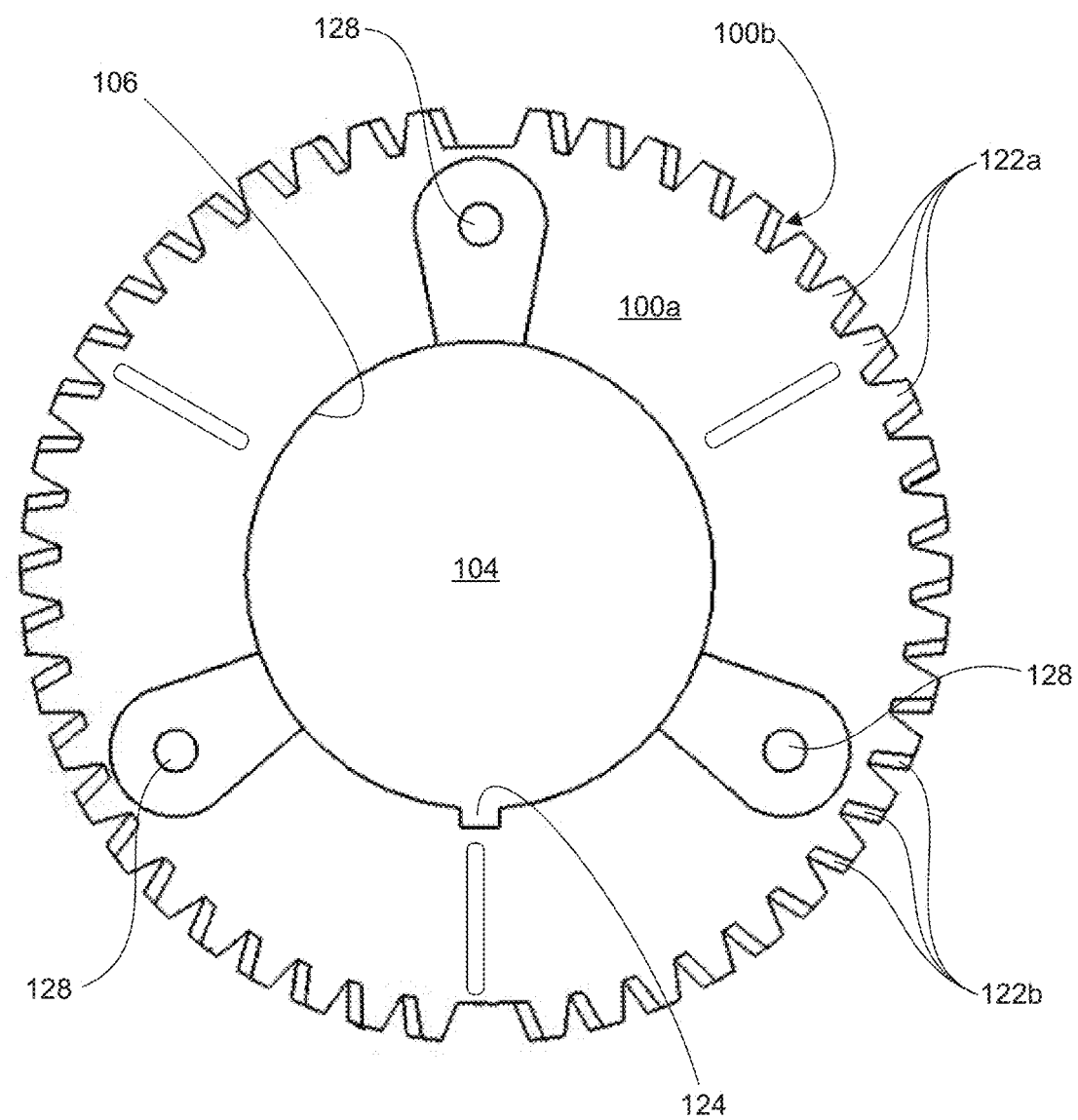
FIG. 11 is a plan view of a pair of opposing plates the alignment of the profile of the periphery offset by plate stack reversal for angular offset of the profile.

FIG. 11 shows a plan view of a pair of filter plates 100a, 100b stacked as described above, i.e., one plate "facing-up" and the other "facing-down" and alignment holes 128 are aligned. As can be seen, the teeth 122a of plate 100a are angularly offset, e.g., about 1°, from the teeth 122b of plate 100b, resulting in offset edges of assembled filter plates 100. In embodiments the teeth of adjacent plates 100a,100b are oriented with respect to an alignment keyway 124, a reference tooth being angularly skewed, for example, by less than ½ particle size. This alternate upright and upside down plate stacking results in in slight misalignment of the plate edges at the gap interface, as described in Applicant's copending US published patent application US 2018-0161705A1, which is incorporated herein by reference in its entirety.

Figure 12:
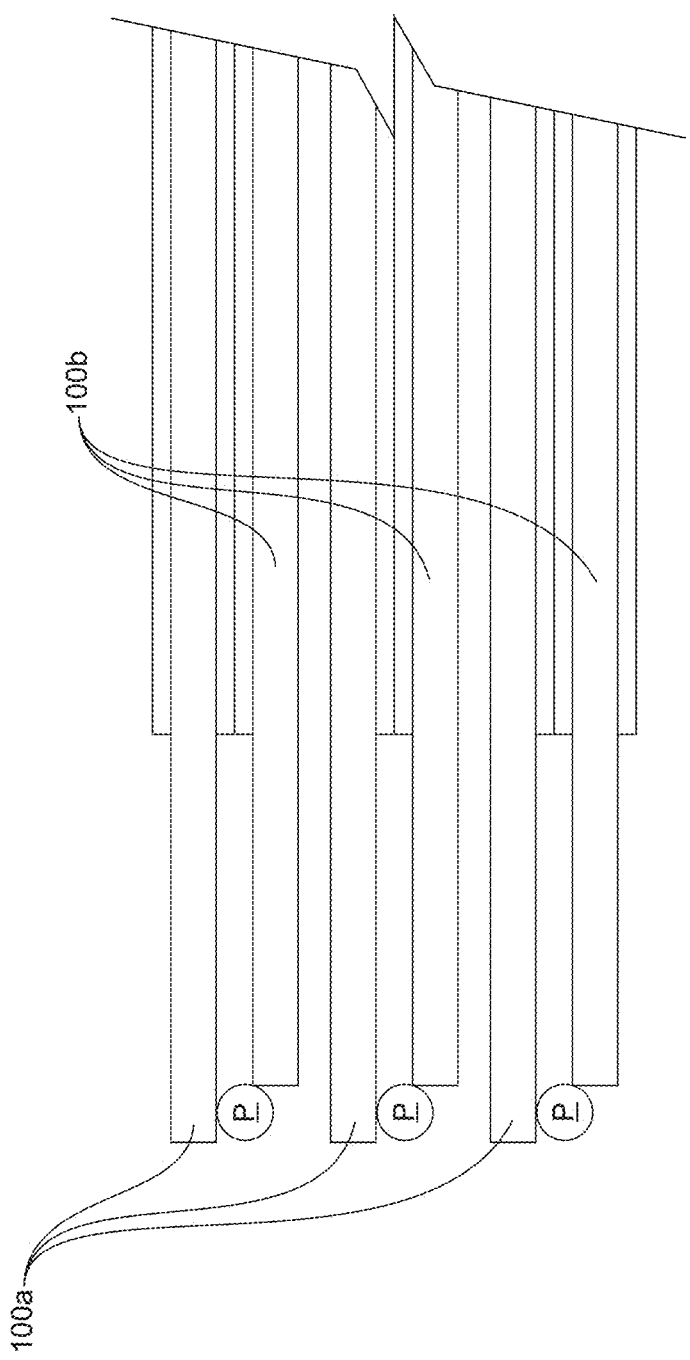
FIG. 12 is a cross-sectional view of a periphery of the stacked filter plates of FIG. 11.

Thus, in order to obtain angular separation the plates' peripheries are pleated and the alignment holes are slightly offset from a symmetrical radial through the pleating profile so that when flipped over, the pleat profile is shifted angularly from the adjacent pleat profile. Pleats both provide an increased surface area as well as a non-tangential face to allow for angular offset. As shown in FIG. 12, for providing a shedding interface, one selected magnitude of the misalignment is at least ½ particle size. Larger or smaller offsets are also employed so as to cover a larger or smaller range of particle diameters. Larger offsets aid in the ease of manufacture.

With the assembly comprising alternate flipping of a single plate, used for each of a stack of plates, only one mold is necessary, reducing costs and reducing errors in assembly. An alternate embodiment is to implement a mold for each offset through 360 degrees and thus avoid flipping plates. However, using an offset using ½ degrees, this method would require 720 molds. Another practical alternate embodiment is to implement two molds, the alignment holes arranged to alternate ½ degree clockwise and ½ degree counterclockwise each alternating plate.

Plates 100 may further comprise plate bosses 142 to space adjacent plates 100,100. The plate bosses 142 can be spaced about the plate's circumference at an intermediate radial orbit. For gap dimensional stability, plates 100 having a large radial extent, or which are subject to compressive forces can benefit from additional tooth bosses 144 (see FIGS. 14A,C and 15A,B) spaced about the plate's circumference at the pleated edge and spaced circumferentially intermediate the plate bosses 142. With reference to FIGS. 14B, 15A and 15B, the pleated edge 120 comprises a plurality of teeth 122 and boss teeth 122S having tooth bosses 144 thereon.

The plates 100 can be made of a synthetic material for reduced fluid friction and for erosion resistance. One such synthetic is a polymer material including silica. In one embodiment, the plates are made of a polymer material containing silica including nylon material. An injection mold process can be employed to inject the polymer material into a suitable mold for making the plates.

In some embodiments, the plates 100 are made of a polymer material having a suitable percentage of silica. For example, in one embodiment, the plates 100 are made of a polymer material, such as Nylene® 5133 HS having about 33% silica, manufactured by Nylene Canada Inc. of Arnprior, Ontario, Canada. In another embodiment, the plates 100 are made of a polymer such as Vydene® R533 NT having about 33% silica, manufactured by Ascend Performance Materials of Houston, Tex., United States of America.

An inert polymer with a silica base is quite chemically neutral and can in the order of at least 5× stronger than a stainless material without issues caused with $H_2S$ stress cracking or oxidation problems associated with carbon steel. The polymers are also recyclable.

Those skilled in the art appreciate that the plates 100 may alternatively be made of other suitable materials such as carbon steel or stainless steel. However, compared to plates made of steel, the polymer plates 100 have advantages including reproducible manufacturing tolerances in the order of within 5/10,000ths of an inch. Such tolerances are more difficult to achieve economically in materials such as carbon or stainless steel. Polymer plates may have compressive strength in the order of at least 10,000 psi, contribute to lowering pressure drop due to reduced surface drag, and are also chemically resistant to oilfield chemicals.

Boundary Layer Manipulation

With reference to FIGS. 4B, 5C and 5D, and returning to Applicant's improvement in flow between closely-spaced plates, one embodiment is to create a lip 150 (a flow stream trip lip) at the leading (inlet) edge of the plate, herein shown located at the outer edge 108 of the plate. In embodiments, lip 150 is an annular shoulder or protrusion that extends axially, preferably perpendicularly, from the flow surface of the plate into gap 102 at the outer edge 108 of plate 100, around the entire outer edge.

Without being limited to theory, a comparison of FIGS. 4A and 4B shows schematically what the Applicant believes is the effect of lip 150 on the fluid mechanics and resulting flow of fluid between two closely-spaced plates. FIG. 4A, demonstrates a flow passageway (the gap) that is bounded between two plates separated by a distance 2h. Boundary layer growth (dashed line) begins on each plate at the entrance (fluid inlet) to the flow passageway between the spaced plates, and is restricted before the fluid can exit the flow passageway between the plates. Thus, the plates are too close together to allow free flow to be re-established and the flow passageway becomes plugged with fluid ("liquid lock").

In FIG. 4B, lips 150 at the entrance (fluid inlet) of the flow passageway between the spaced plates likewise create an opening having a distance 2h. Thus, these plates would exclude the same sized particulates as the arrangement in FIG. 4A. However, the lips 150 extend for only a short distance along the flow passageway, and then cause the flow passageway to abruptly enlarge, and fluid emerging from the gap between the lips is unable to follow the abrupt deviation of the boundary. It is believed this abrupt deviation causes pockets of turbulent eddies in the flow after the lips (curved arrows), preventing attachment of fluid to the walls and moving the formation of the boundary layers further down the walls to a point where they do not interfere with one another before the fluid outlet, or the interference is minimized.

As demonstrated in the empirical results disclosed herein, it is believed that this modification or manipulation of the formation of the boundary layer by lip 150 enhances the flow of fluid through a passageway, "enhance" meaning that the flow rate of the fluid at a given pressure drop is increased and/or the pressure drop along the passageway at a given flow rate is decreased. Another theory or explanation for the operation of the invention described herein is that the lip (or lips) acts as a nozzle at the entrance to the flow passageway between the plates.

In embodiments lip 150 is dimensioned (short) in the flow direction so that a boundary layer is not formed thereon by fluid flowing along the lip. The wall spacing immediately following the lip 150, opens to a downstream passage, gap 102, which is of sufficient dimension that a boundary layer does not attach to the wall behind the lip 150 for at least a working distance downstream thereof. For circular plates, the working distance is normally the radial extent of the plate from inlet edge (edge 108 in this case) to outlet edge (edge 106 in this case). On linear passageways, the working distance is simply the length of the plate from inlet edge to the outlet edge. Returning to the illustrated generally circular plates, in instances where the radial depth of the plate exceeds the working distance, subsequent and supplementary lips 150 can be provided as discussed below.

Without fluid boundary layer attachment to a wall, there is little or no boundary layer growth at the upstream inlet to the passage or gap 102 between the plates, resulting in a reduced need, or extent of which, to forcibly increase velocities to maintain throughput that otherwise would create additional pressure drop.

Figure 7B:
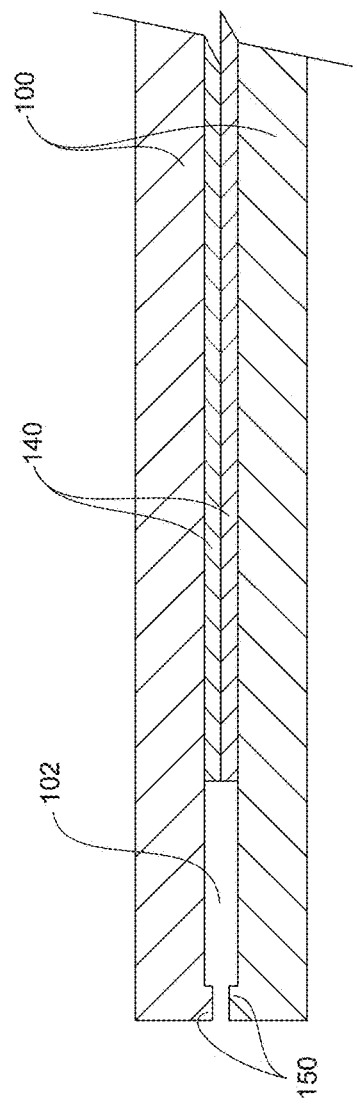
FIG. 7B is a side cross-sectional view of opposing plates of the configuration shown in FIG. 7A, each plate having spacing bosses sized to space the respective trip lips apart to the design spacing for the design flow rates.

As shown schematically in FIG. 4B, and structurally in FIG. 7B, test plates were fabricated each with a 50 µm lip 150 (50 µm being the distance that the lip extends perpendicularly from the surface of the plate 100 into gap 102), a 100 µm boss 140. When coupled as a pair of opposing, like plates 100,100, sandwiched boss-to-boss, a 200 µm gap 102 is created behind the lips 150, to create a void large enough to avoid or delay the formation of a boundary layer. This geometry provides a 100 µm inlet gap or space between the lips 150,150, equal to the 100 µm spacing of the plain, planar, and lipless plate filter of FIG. 5A.

For a silica/polymer plate having a body thickness of about 1.25 mm (1250 um), a 100 µm boss 142, and a 50 µm lip 150, the radial width of the lip was designed to be about 1 mm (1000 um), considered to be about a minimum for consistency of fabrication and operational strength given the materials used. In preferred embodiments the lip 150 maintains the particle-release overlap as larger and larger diameter plates are used. For example, for plates angularly offset by a ½ degree rotational offset, on the sides of the teeth, the radial lip would then need to be wider for larger diameter plates. The plate filter material is a Nylene® (or similar material) which is a silica matrix suitable for injection molds. This material has a low enough thermal shrinkage (about 3%) that it does not impact the dimensions of the molded product. To meet the spacing specifications, machining tolerances were maintained within 5/10,000" or about 13 um.

Experimental data confirms that this arrangement not only reduces pressure drop through a plate filter but also prevents the flow instability and liquid lock experienced in the smaller 50 and 75 µm lipless plate filters.

Returning to FIG. 8, a comparison of pressure drop to flow rate is shown for filters using stacked plates with and without lips. Each filter is an eight hundred (800) plate stack having an inlet spacing of 100 µm. The space between stacked plates of filter without lips is 100 µm, and inlet gap or space between the lips 150 of stacked plates with lips is 100 µm. Downstream of the lips, the space between the plates of the filter with lips was about 200 µm. Referring to curve 170, and using curve matching techniques, for a plate filter without any leading edge lip 150 the pressure differential for water rose rapidly from 6 psi to 26 psi for the flow range tested, and had a pressure proportional to the 1.996 power of the flow rates. Referring to curve 180, for the plate filter with the lip embodiment, the pressure differential for water only climbed from 3 psi to 7 psi for the same range of flow rates, and the pressure drop was proportional to the 1.444 power.

The difference in the powers is attributable to the presence of the lip 150. This difference in powers becomes more significant as the flow rates through the plate filter increase. One advantage of the plate filter fit with a lip 150 is that a shorter filter stack could be provided, using fewer plates, for the same performance. Alternatively, the same number of plates could be used but the filter would be rated at a higher throughput.

Figure 14A:
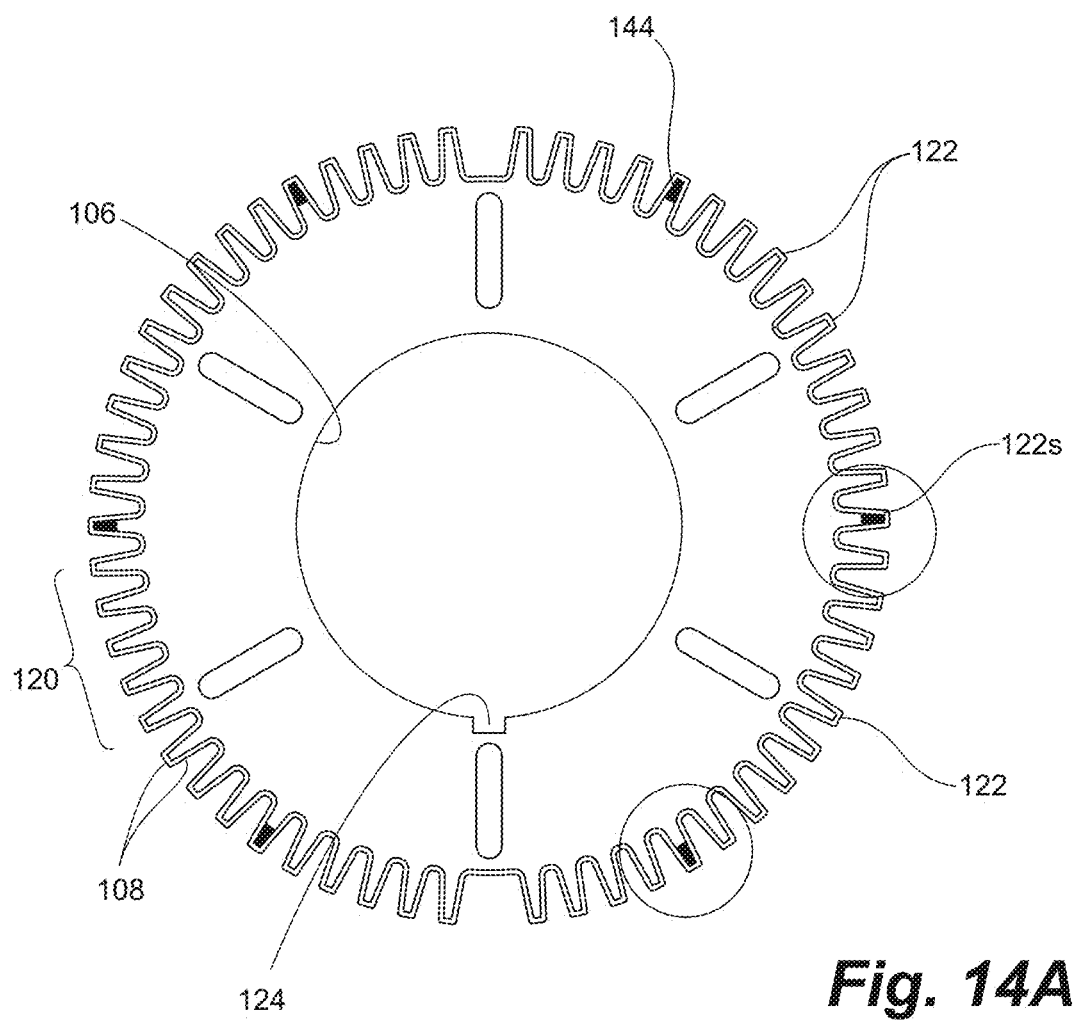
FIGS. 14A and 14B illustrate a plan view of an alternative embodiment of a trip-lip plate and a perspective view of an example tooth of the plate of FIG. 14A respectively.
Figure 14C:
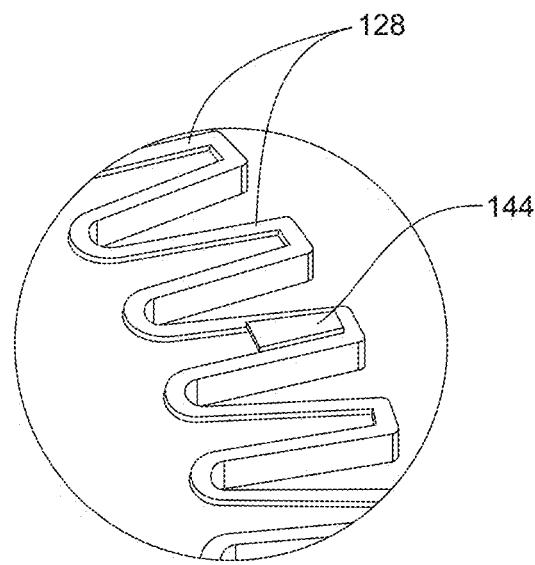
FIG. 14C is a perspective view of an angular portion of the trip-lip plate of FIG. 14A, illustrating an intermediate tooth formed with a nib boss thereon.
Figure 14B:
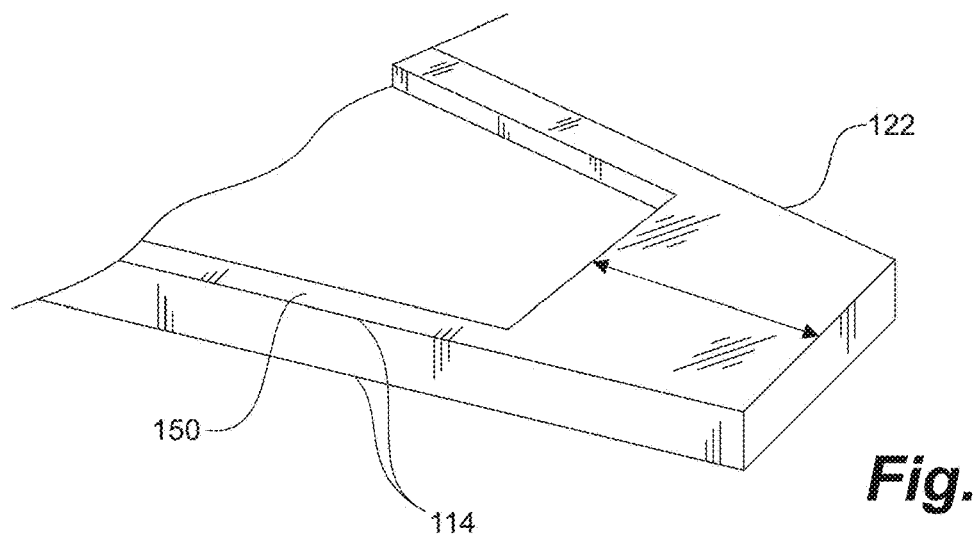
Figure 15A:
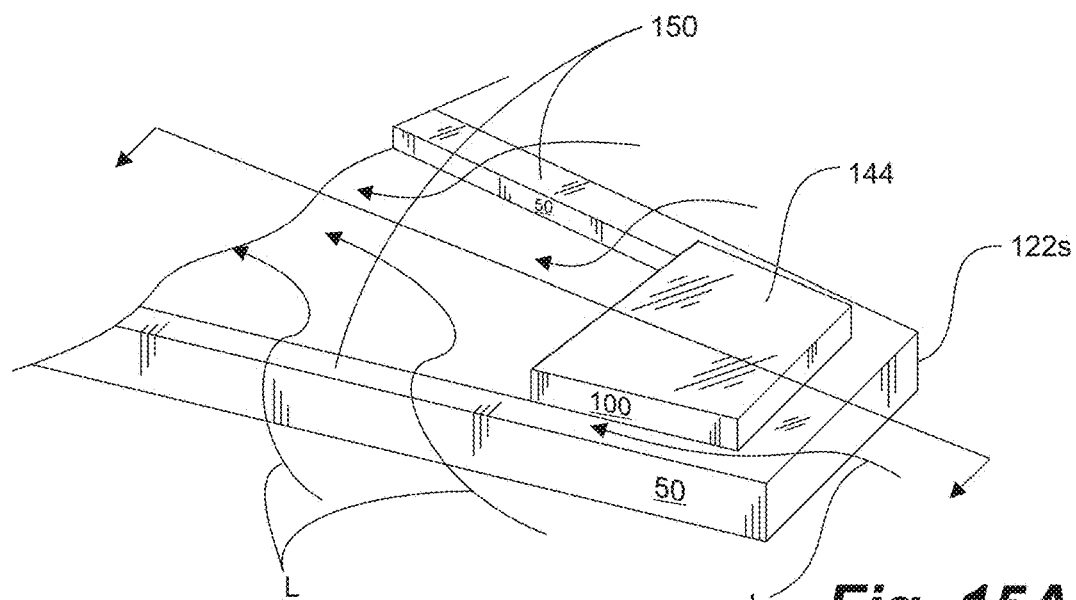
FIGS. 15A and 15B are perspective views of the example tooth FIG. 14B with a spacing nib boss thereon, and a side cross sectional view of teeth of adjacent plates respectively, the teeth of FIG. 14A being spaced by the nib boss and illustrating a rejected particle.
Figure 15B:
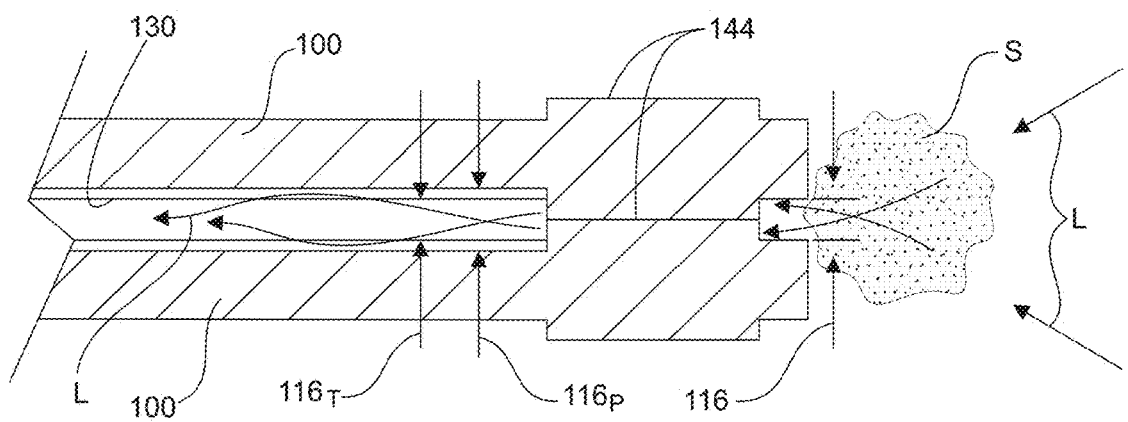

In the embodiments shown in FIGS. 5C and 14A, designed for out-to-in flow, lip 150 is an annular shoulder situated at the outer edge 108 of plate 100, around the entire outer edge. In other embodiments, where flow is in-to-out, lip 150 may be at the inner edge 106 of the plate, around the entire inner edge. The width of lip 150 may be the same along its length, as shown in FIG. 14A,C, or it may have different widths along its length, as shown in FIG. 14B. In embodiments, only one surface of a plate has a lip 150, the other surface being flat, so that a stacked filter may be formed in which some of the pairs of adjoining plates 100,100 do not have lips 150, or only one of the pairs of adjoining plates 100,100 has a lip 150.

In the embodiments shown in FIGS. 5D, 7A-C, 14A-15B, lip 150 is a rectangular shoulder in cross section, having a flat/planar surface. Embodiments of the lip 150 included herein may have other shapes, geometrical or not, which extend axially into the gap 102, and which create a suitable obstruction to the flow of particulates into gap 102 and function so as to manipulate the boundary layer as described herein. For example, lip 150 may be triangular, oval or crescent shaped in cross section. The dimensions of the lip 150 will depend on, among other things, the dimensions of the plate, the materials used to fabricate the plate, the types of fluids and particulates being separated and the operating conditions.

As introduced above, it is believed that the boundary layer manipulation by lip 150 has a working distance on a wall before the boundary layer reforms or begins to reform downstream and layer displacement again encroaches on the ability of fluids to flow between plates. In the context of the plates tested by Applicant above, a 50 µm high×1 mm wide lip positively influences free stream flow up to a distance of at least about 10× the height downstream, so in this case at least about 500 µm. Periodic and repeated introduction of lips, as necessary, may improve the flow performance over longer flow distances, and also over shorter distances. These additional lips also serve to provide an additional "gauge" of the outer lip, in the event the outer lip becomes damaged, for example by erosion. Thus, as shown schematically in FIG.

9 and structurally in FIGS. 10B and 10C, in embodiments plate 100 includes subsequent lips 150a,b disposed downstream of a first lip 150, and the subsequent lips 150a,b height can have the same dimensions (height, length and shape) as the initial lip 150 at the fluid inlet (FIG. 10B), or different dimensions (FIG. 10C shows lips of diminishing height). The gap 112 between lips 150 at the fluid inlet sets the particle exclusion dimension.

Further illustrations of embodiments are described with reference to FIGS. 14A to 15B. In these embodiments, adjacent filter plates 100,100 provide gap 116T that is amenable to the passage of liquid L but not sand S. Lip 150 about the periphery of the plate forms a narrow gap 116T for particle exclusion and a wider gap 116P therebehind for transport of the liquid L to central opening 105. Tooth boss 144 provides additional gap dimensional stability.

Additional laboratory and field testing demonstrates the operability of the apparatus and method disclosed. In laboratory tests a centrifugal pump was used to flow fresh water through plate stacks with different spacings between plates and at various flow rates.

A stack of ninety-five (95) plates, without a lip 150 and with a 100 μm space between plates was prepared and ten laboratory trials were conducted, each at five discreet pump levels. Flow rates were measured with a container of a known volume and a timer. For each flow rate the pump was run long enough to stabilize the flow loop and take readings, which was approximately five minutes per test. No temperatures were taken during the trials.

Figure 16:
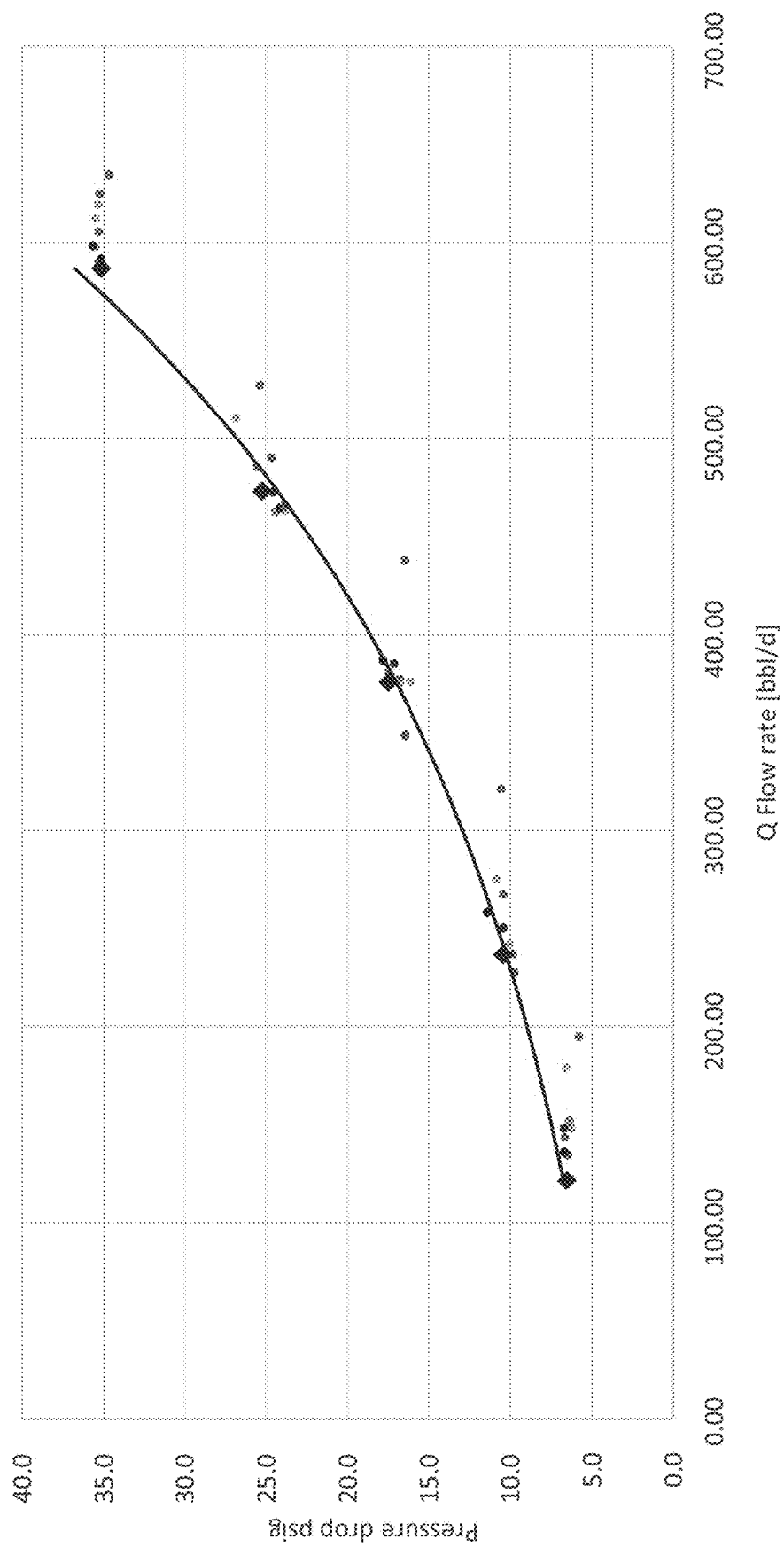
FIG. 16 is a graph illustrating the general pressure drop performance for a stack of 95 plates with no lip, spaced apart by 100 µm, tested on water.

The results, plotted as pressure differential (psig) vs. flow rate (bbl/d), are shown in FIG. 16. Of note, each successive trial indicated a lower pump rate than the prior trial. At the time, this was attributed to testing error, filter stack settling, or filter stack fouling. On further analysis and a result of additional testing this time related degradation of filter performance was observed in most tests. FIG. 16 uses the trend from the last trial (#10), to represent the flow rate-pressure differential relationship.

When 95 plates without a lip, were spaced apart a distance of 75 μm between plates, and tested as above, again each successive test had higher pressure drop than the prior test so much so that at trial #10, no flow was established.

Plate molds or injection dies, for manufacturing plates, were machined to obtain higher tolerances on the plates. Four dies, for a 0, 25, 50 and 100 μm nominal spacing between the trip lips of paired plates (i.e., the flow gaps), were machined. The actual plate spacing was measured after the plates were produced, as the physical dimensions are influenced by shrinkage of the injected material, the size of the dimensioned items, the total force of the injector press and by relative proximity of the dimensioned item relative to the injector locations. It was determined that the lip 150 at the outside edge of the plate had a different overall shrinkage than the formed bosses used to separate the plates. In addition, the design employed two different sizes of bosses, and these had different shrinkage characteristics. In many cases, the injector press was insufficient to keep the dies completely closed resulting in a small amount of flash material extruded where the facing dies meet. This flash, no matter how small can result in an out-of-spec plate. To mitigate the effect of flash material on fluid flow between adjacent plates, the dies were redesigned so that the flash material, if formed at all, would be deposited intermediate the plate inlet edges, away from the facing corners or edges of the plate 114 where fluid influx occurs.

The following plate combinations combine to form the actual flow inlet gap between adjacent plate lips. As an example, the 50+50 plate comprises two plates each with a lip of nominal 50 μm in height (100 μm total), which are used to create a nominal 100 μm gap between the lips and a nominal 200 μm space between the plates. This combination results in an actual total trip lip height of 127 μm, a flow gap between the lips of 86.36 μm, and space between the plates of 213.36 μm.

| | INTERPLATE SPACE | | TRIP LIP HEIGHT | | AVAIL. FLOW GAP | |
|---|---|---|---|---|---|---|
| | in | μm | in | μm | in | μm |
| 25 + 0 | .0081 | 205.74 | 0.0086 | 218.44 | −0.0005 | −12.70 |
| 25 + 25 | 0.0082 | 208.28 | 0.0076 | 193.04 | 0.0006 | 15.24 |
| 50 + 0 | 0.0082 | 208.28 | 0.0073 | 185.42 | 0.0009 | 22.86 |
| 50 + 25 | 0.0083 | 210.82 | 0.0063 | 160.02 | 0.0020 | 50.80 |
| 50 + 50 | 0.0084 | 213.36 | 0.0050 | 127.00 | 0.0034 | 86.36 |
| 100 + 0 | 0.0116 | 294.64 | 0.0095 | 241.30 | 0.0021 | 53.34 |
| 100 + 25 | 0.0117 | 297.18 | 0.0085 | 215.90 | 0.0032 | 81.28 |
| 100 + 50 | 0.0118 | 299.72 | 0.0072 | 182.88 | 0.0046 | 116.84 |
| 100 + 100 | 0.0152 | 386.08 | 0.0094 | 238.76 | 0.0058 | 147.32 |

Laboratory tests were run on a 50+50 plate combination (nominal 100 μm flow gap, actual 86.4 μm flow gap) and a 25+25 plate combination (nominal 50 μm and actual 15.24 μm flow gap). In addition, plates with no lips and spaced apart by 100 um or 75 μm plates were rerun with the same liquid delivery pumps and configuration as the plates having the lips, in order to again compare performance of a plate stack comprising plates with lip to a stack of plates without a lip.

Normal or "out-to-in" flow (from outer edge 108 to inner edge 106) was performed by running two different pumps at various flow rates to achieve at least five different flow rates, measuring flow rate, inlet pressure, outlet pressure and temperature. Efforts were made to run the test for each individual flow rate for at least one hour in length.

Reverse flow, or "in-to-out" (from inner edge 106 to outer edge 108) was performed to establish the impact of the lip on flow. Fluids in normal flow enter the fluid inlet and first pass over the lip (if present) and continue through the adjacent plates' gap to the fluid outlet. In reverse flow, the fluids flow through the adjacent plates' gap from the fluid outlet and exit over the lip (if present). In reverse flow, a lip effect on fluid inflow is nullified.

Of interest, while the lip is believed to modify the boundary layer, it is possible that some of the reduction in pressure drop was due to a larger interplate spacing behind the trip lip. The nominal interplate spacing of about 200 μm for plates with a lip is double the 100 μm space between plates with no lip. It should be noted that it is possible the "in-to-out" flow is handicapped by additional turbulence caused by the mandrel in the centre opening 104 of the plates in the stack, and because of the smaller inside diameter of the inner edge 106 (as compared to the outer edge 108), this turbulence may therefore be different than that for flow in the reverse direction.

Figure 17:
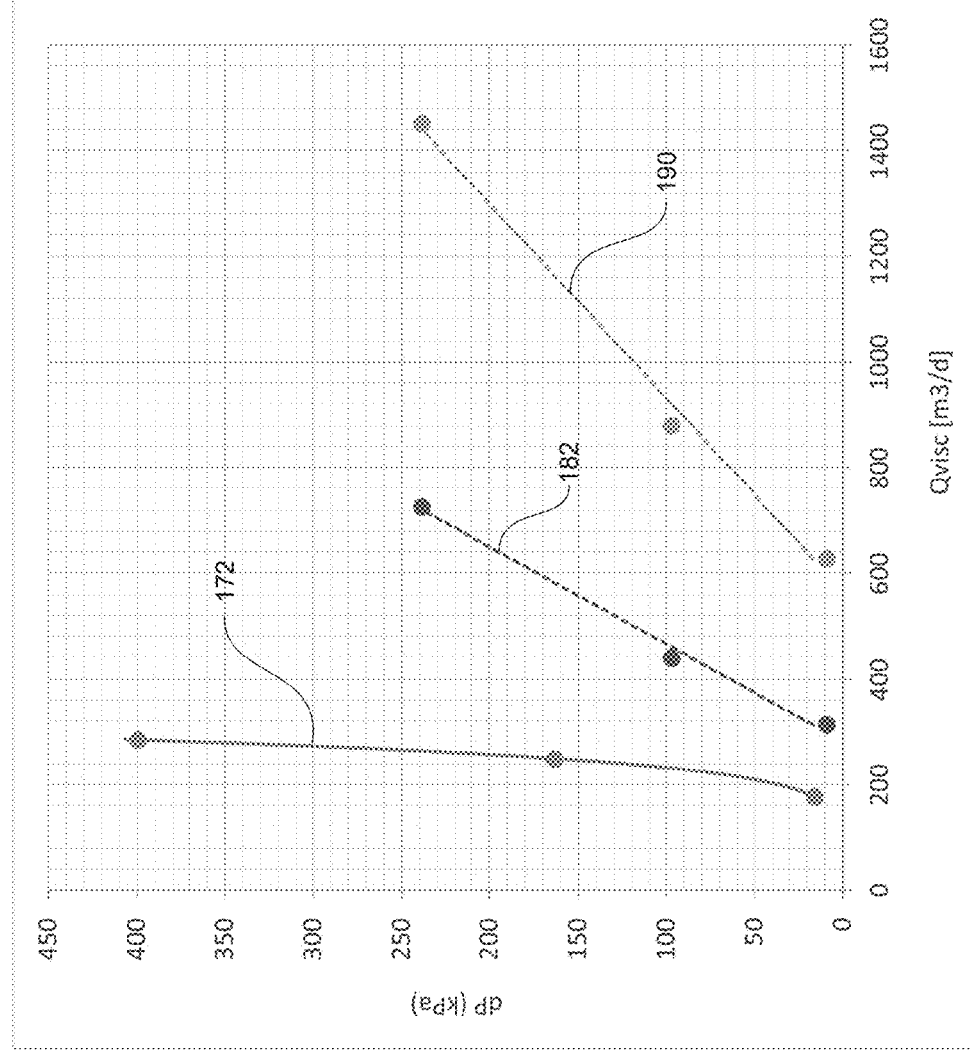
FIG. 17 is a graph illustrating the general pressure drop performance for a stack of 406 plates (curves 172 and 182) or 800 plates (curve 190) which have a nominal 100 µm gap between opposing lips on the plates.

FIG. 17 shows the results of laboratory flow tests done with the 50+50 plate combination in a stack of 406 plates or 800 plates. Pressure differential is plotted against forward and reverse viscosity adjusted flow. A comparison of the forward or "out-to-in" test (curve 182) where the trip lip is active and the reverse or "in-to-out" test where it is not (curve 172), shows that about three times the flow can be expected for a given pressure drop (e.g., at 150 kPa, flow is about 200 for reverse vs. about 600 for forward). This demonstrates that for the given geometry, the lip 150 improves flow presumably because of boundary layer modification resulting from its use. Curve 190 shows the results for a forward flow test on a stack filter comprising 800 plates. Curves 182 and 190 are linear, whereas for curve 172 the pressure drop is proportional to the 6.7591 power.

In running the individual test, for normal flow, it was observed that there was some flow instability over the one hour test period. In most flows trials, the pressure drop increased and the flow rate decreases as the test proceeded. The chart below shows the marked degradation of filter performance over the course of the test It was observed that there was some flow instability over the one hour test period. In most flow trials, the pressure drop increased and the flow rate decreased as the test proceeded.

Considering the flow profiles across a plate as determined by Blasius 1908) or the Hagen-Poiseuille flow in small diameter tubes, pressure drop is proportional to some geometry parameters as well as fluid viscosity and flow rate, as follows:

$$\Delta p \propto C \mu Q$$

To determine the geometry parameter C, for these trials, the pressure drop divided by the viscosity adjusted flow rate ($\Delta P/\mu Q$) was plotted over time (as what is referred to as a "stability chart). If the geometry parameter is constant, then $\Delta p/\mu Q$ should be constant and the plots should yield a vertical line. If the geometry parameter is not constant, then the $\Delta p/\mu Q$ is not constant, and the plots will trend towards horizontal, suggesting that at some point flow will not be sustainable, i.e., there is a point above which flow cannot be established.

For reverse flow (i.e., in-to-out; equivalent to a no lip test) the geometry parameter was found to change over the course of the test, which suggested that at some point in time, flow might not occur. This point is approximately 240 m$^3$/d, as shown in FIG. 17.

For forward flow (i.e., out-to-in; lip active) the geometry parameter was also found to change over the course of the test, however the constant was about an order of magnitude smaller than the constant for the reverse flow test. At lower throughput rates for the forward flow test, the geometry constant was relatively stable and appeared to improve over time.

The 50+50 plate combination (nominal 100 μm actual 86.4 μm opening between the lips) was used in field trials of an 800 plate stacked plate filter. While the laboratory tests were conducted in a controlled environment with a single-phase fluid, the fluids in the field tests were multiphase fluids, including gas, oil, emulsions, waxes and water.

To compare against the single-phase flow data, the field data was converted to a single pseudo phase by estimating the volumes at flow conditions in the filter using industry PVT correlations, estimating the associated viscosities of the fluid, accommodating for dissolved gas in solution for the oils and adjusting the viscosities for temperature.

The test data used for the 100 μm plate were based on linear correlations adjusted for viscosity variations due to temperature variations that occurred during the tests and adjusted to the field installations of 800 plates per filter. No adjustment was made for fouling of the filters due to sand production.

Figure 18:
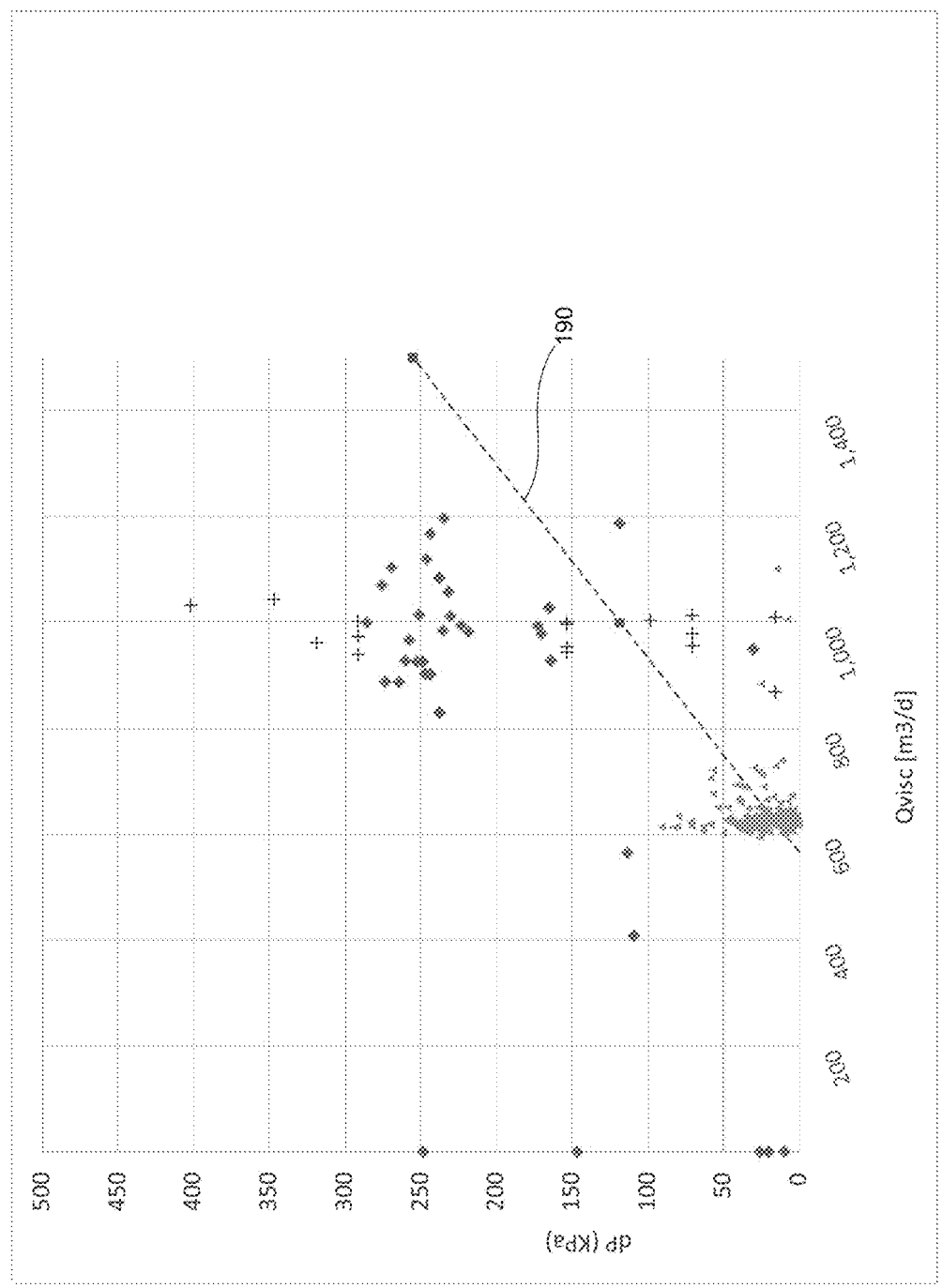
FIG. 18 is a graph illustrating the general pressure drop performance in field trials for wells in Colorado, USA, Alberta, Canada, and British Columbia, Canada, for a stack of 800 plates which have a nominal 100 µm gap between opposing 50 µm lips on the plates, line 190 shows the results of the laboratory flow test for comparison.

FIG. 18 shows a plot of pressure differential (ΔP, KPa) vs. viscosity adjusted flow rate (QVisc m3/d) for various trials. Line 190 shows the results of the laboratory flow test for comparison. The Colorado field tests (A) showed remarkable correlation to the laboratory data, the well-produced high-pressure gas and liquid, the liquid was about 60% water and 40% light condensate. The stacked filter was moved to several locations in Colorado. In one location paraffin wax covered about 80% of the surface of the stacked filter yet the filter was still able to operate at pressures that would be considered to be very low considering the amount of fouling.

A test for a well in Northern Alberta (0) was a high gas rate well with liquid comprising of about 50% water and 50% light oil. The well made considerable sand while the filter was running requiring frequent clean outs.

A well in Northern British Columbia (+) was a high-pressure condensate rich gas well. The production was nominally 1,000 m$^3$/d, pressure drops recorded were from almost zero to over 400 kPa. In some cases, this was due to the wellbore slugging fluids where the instantaneous liquid rate was many times higher than the average rate and where sand production caused partial fouling of the filter.

Considering the instability noted in the laboratory tests, the field data was reviewed to see if the instability was demonstrated by an increase in pressure drop over time. The pressure drop showed the effects of unstable well flow but was generally in line with the decline in well productivity as indicated by the desander operating pressure.

Figure 19:
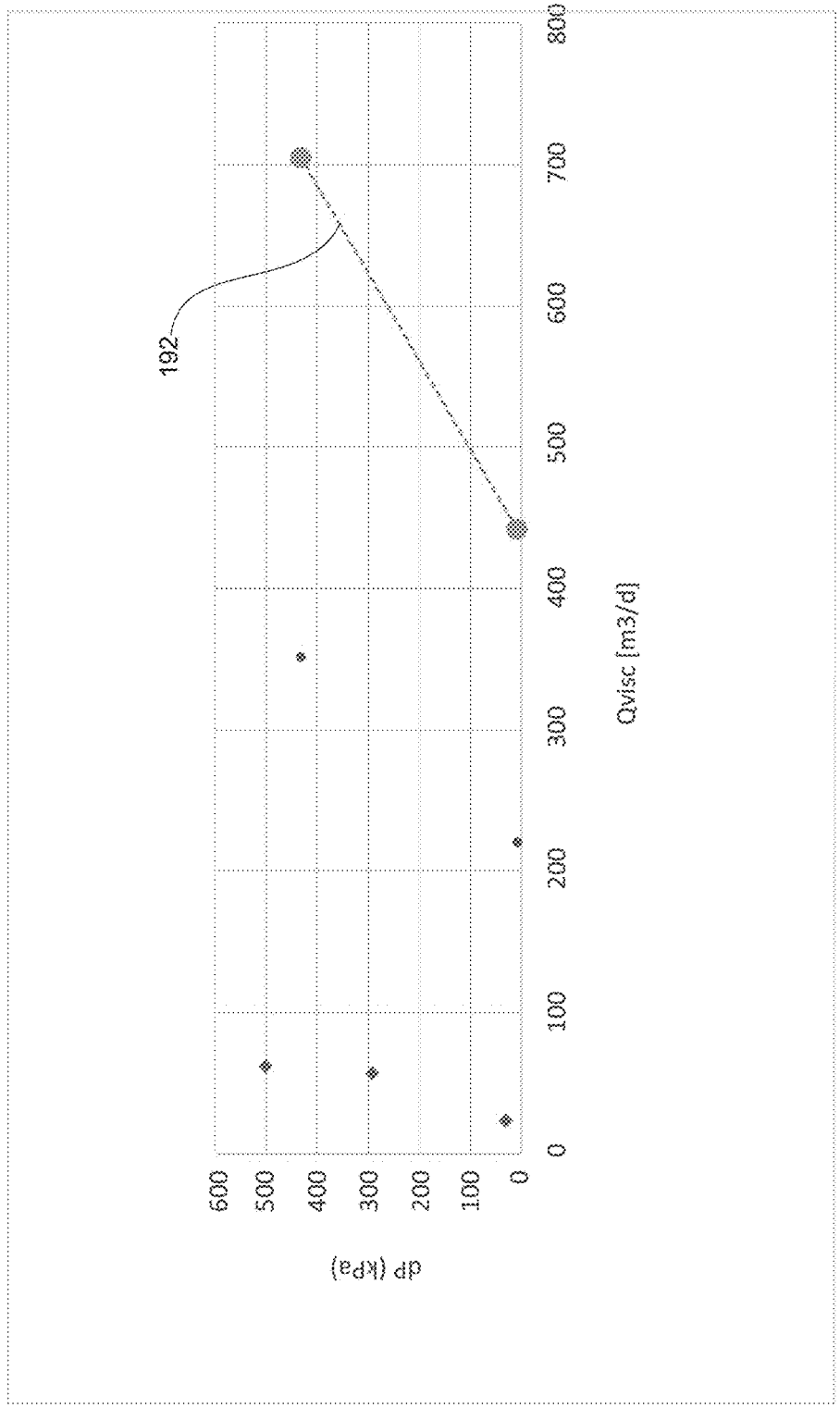
FIG. 19 is a graph illustrating the general pressure drop performance for a stack of 800 plates (curve 192) which have a nominal 50 µm gap between opposing lips on the plates.

FIG. 19 shows the results of laboratory flow tests done with the 25+25 plate combination in a stack of 800 plates. Diamonds (◇) show the reverse flow test data, small circles (●) show the forward flow test data and curve 192 shows the results for a forward flow test.

The stability charts for the forward and reverse flow showed similar characteristics as the 50+50 plate combination flow test. The forward flow test with the 25+25 lip show about a seven times improvement over the reverse flow where the lip is not effective. This confirms the utility of the lip for smaller spaces between the plates and a smaller flow gap. A filter comprising plates with no lip and 15 um space between the plates would not be able to flow any fluid.

Figure 20:
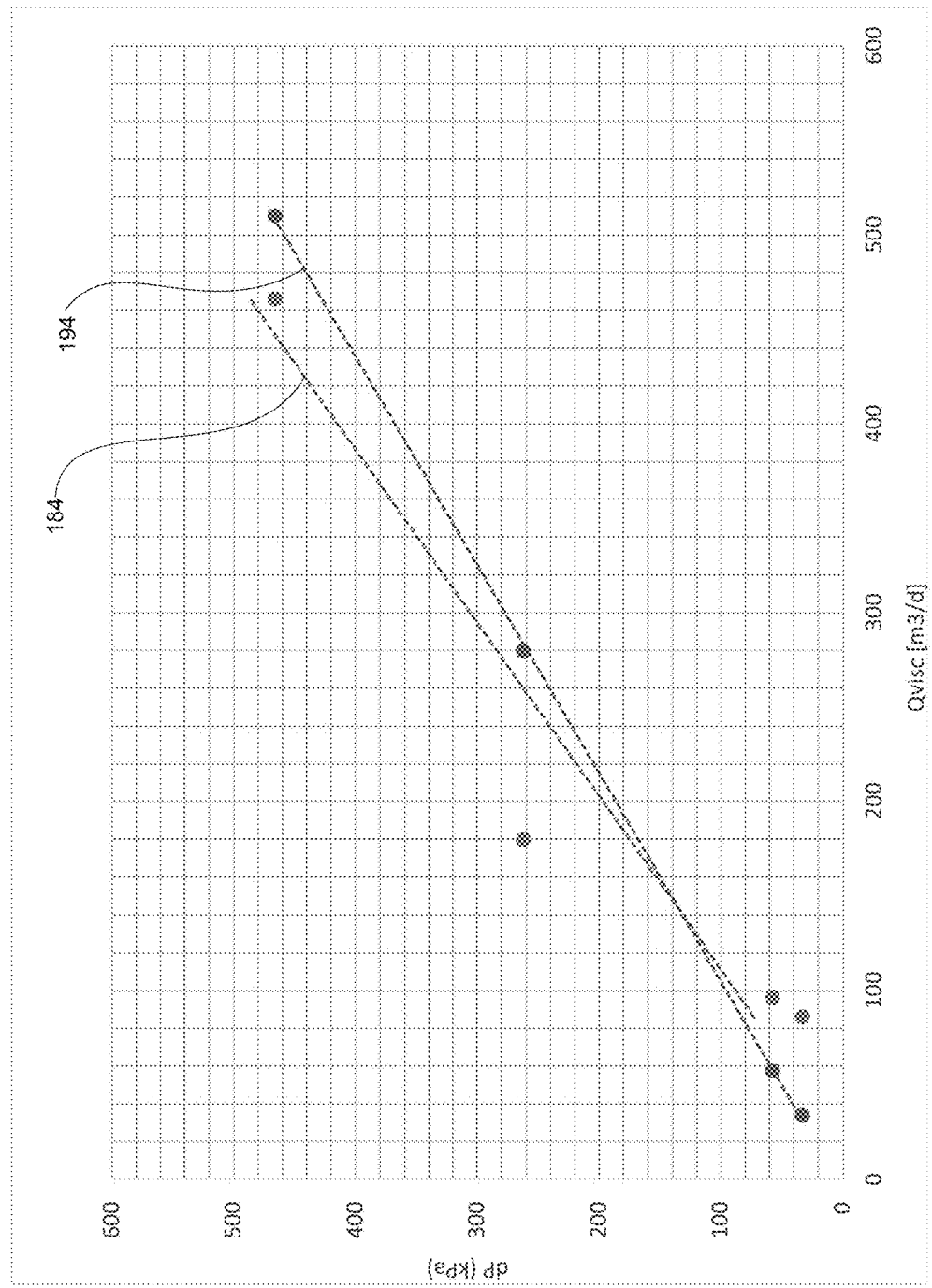
FIG. 20 is a graph illustrating the general pressure drop performance for a stack of plates separated by 100 µm and with no lip, showing that forward (curve 184) and reverse (curve 194), showing that forward and reverse flow are generally the same.

The current test protocol using an extended test period and taking temperature into account, was performed on a stacked plate filter with plates that did not have a lip and which were separated by a space of 100 μm. The results (FIG. 20) confirmed earlier observations. A reverse flow test was conducted for a comparison to the reverse flow tests with plates having a nominal 100 μm flow gap and lips. In the plate with no lips, the reverse flow should match the forward flow, since there is no lip to influence the forward flow. FIG. 20 shows the relative performance of the forward (curve 184) and the reverse (curve 194) flow tests. Considering the instability of the flow rates, the results were consistent with the expectation that the performance should be similar for both directions of flow.

While the apparatus and method has been described in conjunction with the disclosed embodiments which are set forth in detail, it should be understood that this is by illustration only and the method and apparatus are not intended to be limited to these embodiments. On the contrary, this disclosure is intended to cover alternatives, modifications, and equivalents which will become apparent to those skilled in the art in view of this disclosure.

The invention claimed is:

1. A stacked-plate apparatus comprising:
   at least one pair of adjacent plates stacked along an axis, each plate of the pair comprising an outer periphery forming an outer edge and comprising an inner edge, said adjacent plates having opposing surfaces that are parallel to one another and spaced apart axially to form a flow passageway for flow of fluid therethrough from a fluid inlet formed by the outer edges of the at least one pair of adjacent plates, to a fluid outlet formed by the inner edges of the at least one pair adjacent plates, wherein:

a first plate of the at least one pair of adjacent plates has a first lip at the outer edge of the first plate for modifying boundary layer formation on the first plate, the first lip extends axially into the flow passageway at the fluid inlet and extends from the outer edge radially inward, thereby narrowing the flow passageway at the fluid inlet to form an inlet gap; and a second plate of the at least one pair of adjacent plates comprises a second lip at the outer edge of the second plate for modifying boundary layer formation on the second plate, the second lip extends axially into the flow passageway at the fluid inlet and extends from the outer edge radially inward, wherein the inlet gap between the first and second lips is 100 µm or less across.

2. The apparatus of claim 1 wherein the first lip and/or second lip has a planar surface that is generally coplanar with the opposing surfaces of the adjacent plates.

3. The apparatus of claim 1 wherein the first lip and/or second lip is rectangular in cross section.

4. The apparatus of claim 1 wherein the outer edge is an undulating edge of the plate.

5. The apparatus of claim 4 wherein the undulating edge is a pleated edge.

6. The apparatus of claim 1 wherein the first lip and/or the second lip is continuous around the entire outer edge of the respective plate.

7. The apparatus of claim 1 wherein the first lip and the second lip are opposite one another at the fluid inlet.

8. The apparatus of claim 1 wherein the opposing surfaces of the at least one pair of adjacent plates are spaced apart by 200 pm or more.

9. The apparatus of claim 1 wherein the fluid is a liquid.

10. The apparatus of claim 1 wherein the fluid is a gas.

11. A stacked-plate filter comprising:

a plurality of plates stacked along an axis and adjacent one another, each plate comprising a central opening forming an inner edge about the axis and an outer periphery forming an outer edge, said plates being parallel to one another with the upper and lower planar surfaces of adjacent plates spaced apart to form a flow passageway therebetween for flow of fluid therethrough;

a fluid inlet at the outer edges of adjacent plates; and a fluid outlet at the inner edges of adjacent plates, wherein:

the upper surface of each of the plates has an upper lip around the outer edge of the plate for modifying boundary layer formation on the plate, the upper lip extending axially from the upper surface and extending from the outer edge radially inward;

the lower surface of each of the plates has a lower lip around the outer edge of the plate for modifying boundary layer formation on the plate, and the lower lip extending axially from the lower surface and extending from the outer edge radially inward;

the upper and lower lips of adjacent plates oppose one another at the fluid inlet to form an inlet gap, wherein the inlet gap is 100 pm or less across.

12. The filter of claim 11 wherein the upper and/or lower lip has a planar surface that is generally coplanar with the upper and/or lower surface of the plate, respectively.

13. The filter of claim 11 wherein the upper and/or lower lip is rectangular in cross section.

14. The filter of claim 11 wherein the outer edge of each plate is a radially undulating edge.

15. The filter of claim 14 wherein the radially undulating edge is a pleated edge.

16. The filter of claim 11 wherein the upper and/or lower lip is continuous around the entire outer edge of the respective plate.

17. The filter of claim 11 wherein the upper and lower surfaces of adjacent plates are spaced apart by 200 pm or more.

18. The filter of claim 11 wherein the fluid is a liquid.

* * * * *